(12) United States Patent
Zayas et al.

(10) Patent No.: US 8,021,189 B2
(45) Date of Patent: Sep. 20, 2011

(54) ULTRAVIOLET LAMP FOR USE IN WATER PURIFIERS

(75) Inventors: Betty Jean Zayas, Bridgeport, CT (US); Arpad D. Kolbe, Orange, CT (US)

(73) Assignee: Light Sources Inc., Orange, CT (US)

( * ) Notice: Subject to any disclaimer, the term of this patent is extended or adjusted under 35 U.S.C. 154(b) by 0 days.

(21) Appl. No.: 12/032,207

(22) Filed: Feb. 15, 2008

(65) Prior Publication Data
US 2008/0182454 A1    Jul. 31, 2008

Related U.S. Application Data

(63) Continuation-in-part of application No. 11/870,256, filed on Oct. 10, 2007, now Pat. No. 7,795,813, which is a continuation-in-part of application No. 11/675,315, filed on Feb. 15, 2007, now Pat. No. 7,390,222.

(60) Provisional application No. 60/777,213, filed on Feb. 27, 2006.

(51) Int. Cl.
*H01R 5/54* (2006.01)
(52) U.S. Cl. ............................................................ 439/617
(58) Field of Classification Search ............... 439/617, 439/619, 220, 227; 362/217, 260
See application file for complete search history.

(56) References Cited

U.S. PATENT DOCUMENTS

| 2,135,267 | A | | 11/1938 | Alden |
| 2,225,278 | A | * | 12/1940 | Robin et al. ............... 192/48.92 |
| 2,297,188 | A | | 9/1942 | Joyce |
| 3,059,214 | A | | 1/1960 | Heller |
| 3,761,862 | A | | 9/1973 | Spiteri |
| 4,075,531 | A | | 2/1978 | Marino |
| 4,245,875 | A | * | 1/1981 | Shaffer et al. ............... 439/144 |
| 4,256,989 | A | | 3/1981 | Trutner et al. |
| 4,528,429 | A | | 7/1985 | Dobson et al. |
| 4,740,169 | A | | 4/1988 | Gordon |
| D300,215 | S | | 3/1989 | Brenner et al. |
| 4,990,099 | A | | 2/1991 | Marin et al. |
| 5,040,993 | A | | 8/1991 | Krug et al. |
| 5,120,268 | A | | 6/1992 | Gerrans |
| 5,166,527 | A | | 11/1992 | Solymar |
| 5,422,487 | A | | 6/1995 | Sauska et al. |
| 5,471,063 | A | | 11/1995 | Hayes et al. |

(Continued)

FOREIGN PATENT DOCUMENTS

GB    694114    7/1953

(Continued)

OTHER PUBLICATIONS

Kaifeng, H., et al. "Design of a Fluorescent Lamp Control Platform Based on Power-line Carrier," Electronic Measurement and Instruments, 2007. ICEMI 2007, 8th International Conference, Aug. 16, 2007-Jul. 18, 2007: p. 1.

(Continued)

*Primary Examiner* — Alexander Gilman
(74) *Attorney, Agent, or Firm* — Cantor Colburn LLP

(57) ABSTRACT

A lamp base is provided having terminal pins mounted on and extending outwardly along a longitudinal axis of the lamp base. At least one of the pins may be a female pin connector. The female pin connector may be provided within a sheath that extends from an end of the lamp base along a longitudinal axis of the lamp base.

4 Claims, 18 Drawing Sheets

U.S. PATENT DOCUMENTS

| | | | |
|---|---|---|---|
| 5,634,820 A | 6/1997 | Vakil | |
| 5,727,963 A | 3/1998 | Lemaster | |
| 5,857,879 A * | 1/1999 | Endo et al. | 439/851 |
| 5,885,108 A * | 3/1999 | Gerrans, Jr. | 439/606 |
| 5,904,415 A * | 5/1999 | Robertson et al. | 362/260 |
| 6,165,013 A * | 12/2000 | Broussard | 439/606 |
| 6,250,947 B1 | 6/2001 | Holzer | |
| 6,264,508 B1 * | 7/2001 | Lehmann | 439/843 |
| 6,447,319 B1 * | 9/2002 | Bodin | 439/314 |
| 6,634,902 B1 | 10/2003 | Pirovic | |
| 6,641,419 B1 | 11/2003 | Richardson | |
| 6,884,103 B1 * | 4/2005 | Kovacs | 439/336 |
| 6,932,493 B2 * | 8/2005 | Giannopoulos et al. | 362/260 |
| 7,137,728 B2 | 11/2006 | Witham et al. | |
| 7,354,284 B2 | 4/2008 | Aime et al. | |
| 7,390,222 B2 | 6/2008 | Ciancanelli et al. | |
| 7,390,225 B2 | 6/2008 | Elku et al. | |
| D575,742 S | 8/2008 | Scherer | |
| D575,745 S * | 8/2008 | Beckert | D13/161 |
| 2004/0247251 A1 | 12/2004 | Rubino et al. | |
| 2008/0197291 A1 | 8/2008 | Gerardi-Fraser et al. | |

FOREIGN PATENT DOCUMENTS

WO     2006/136026     12/2006

OTHER PUBLICATIONS

International Search Report with Written Opinion, PCT/US08/54118, Date Mailed Oct. 24, 2008.

International Search Report with Written Opinion, PCT/US08/54121, Date Mailed Nov. 3, 2008.

International Search Report with Written Opinion, PCT/US07/04396, Date Mailed Aug. 20, 2008.

* cited by examiner

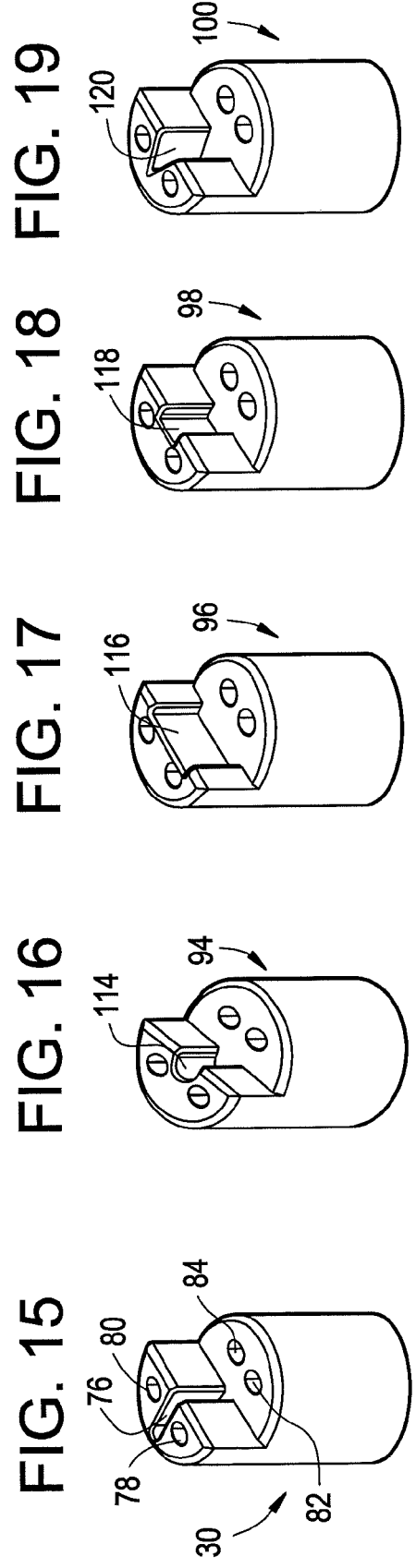

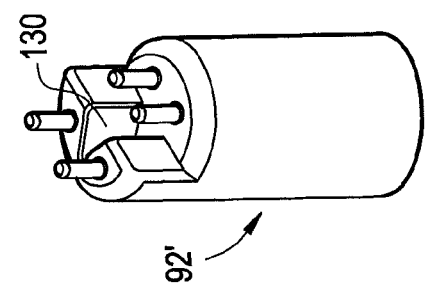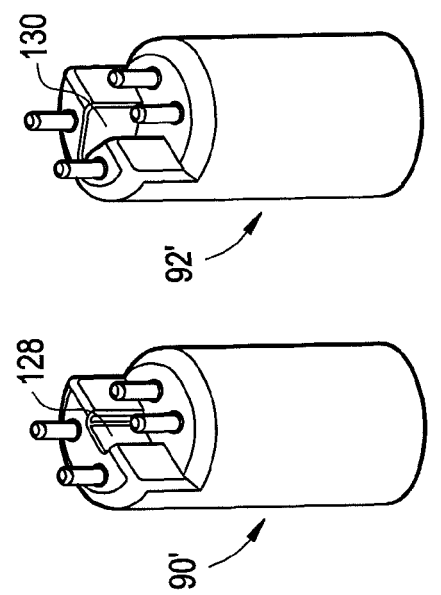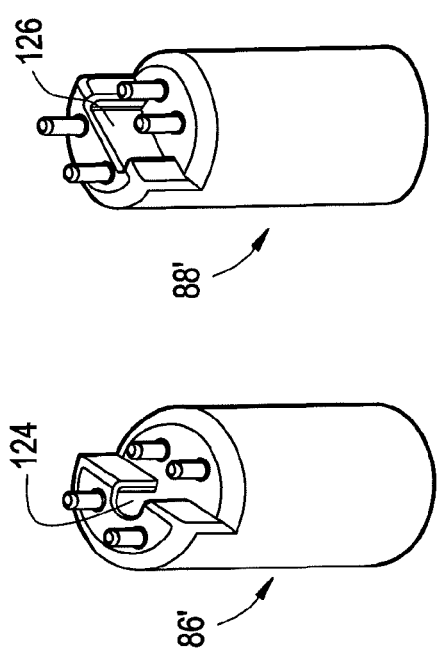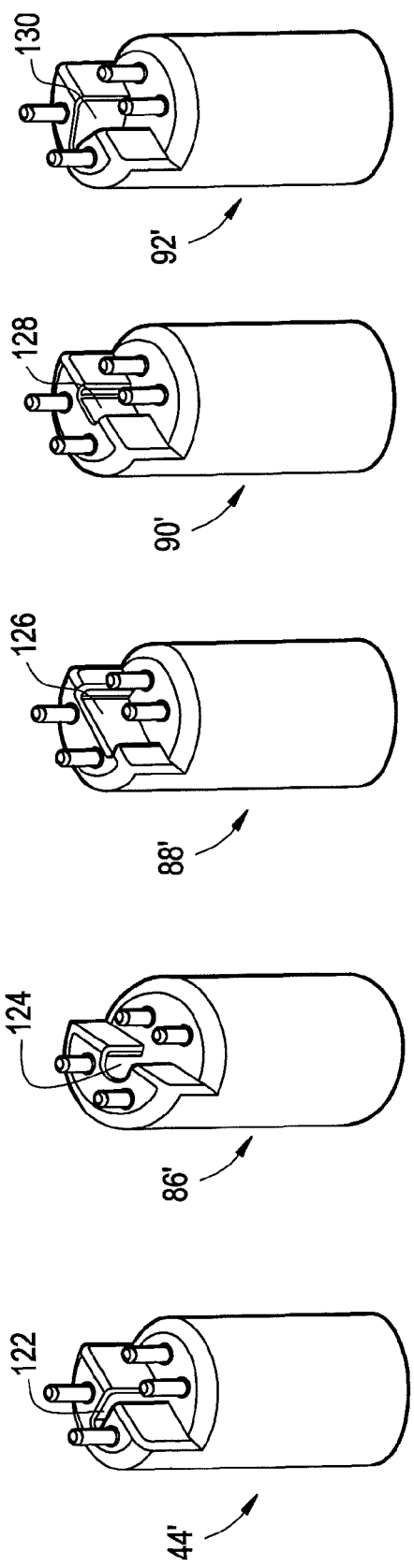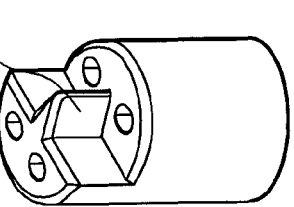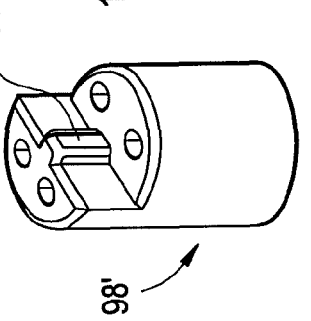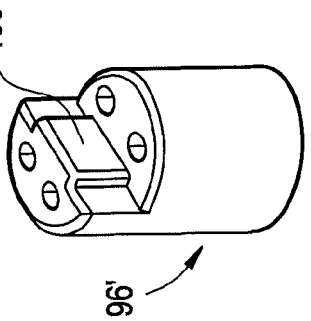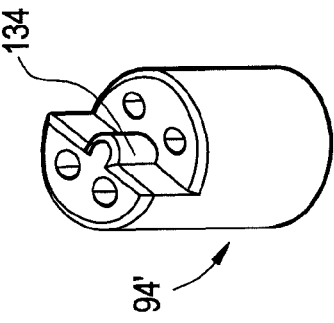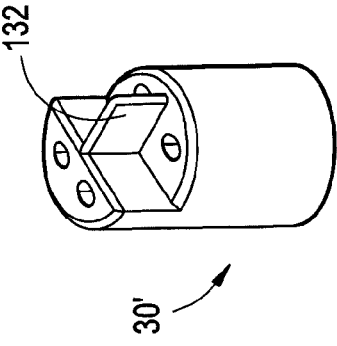

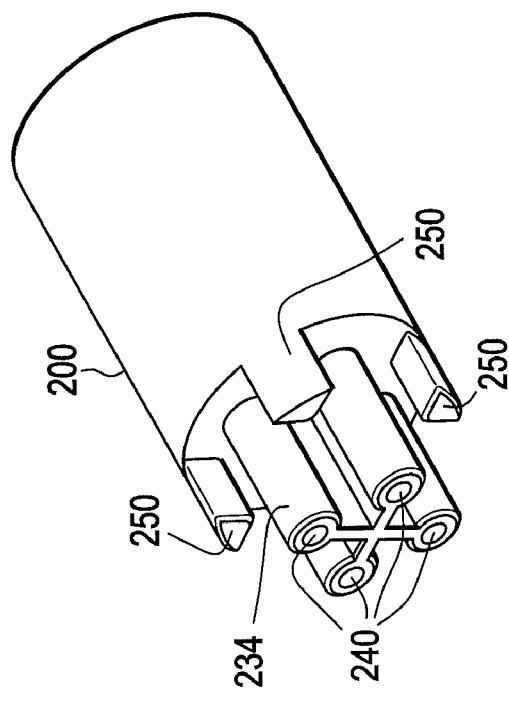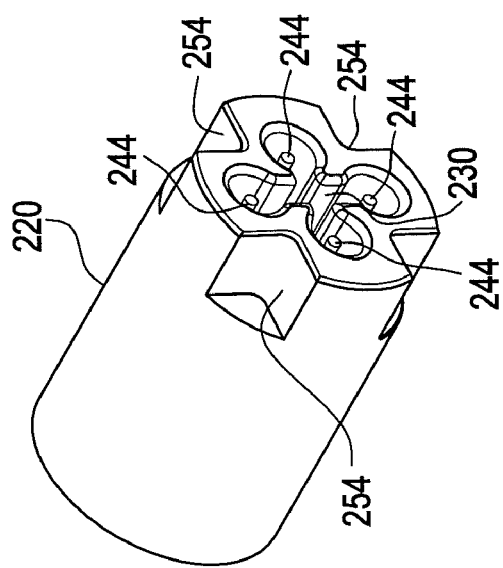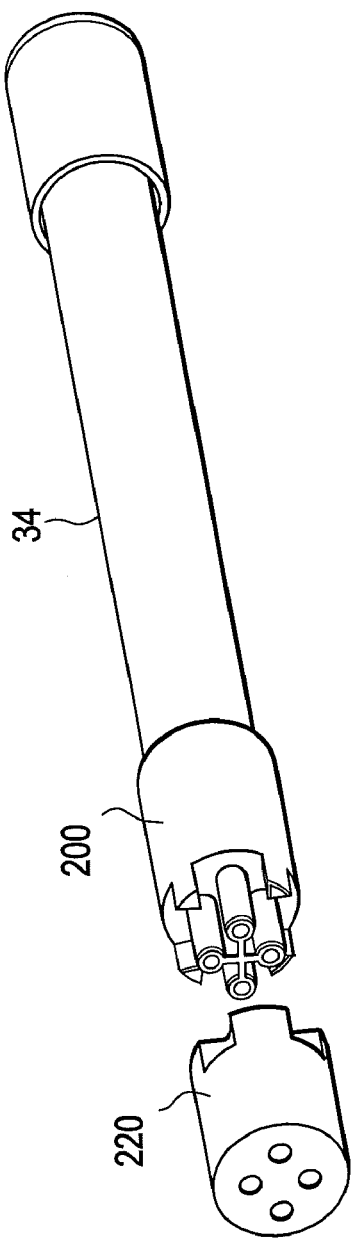

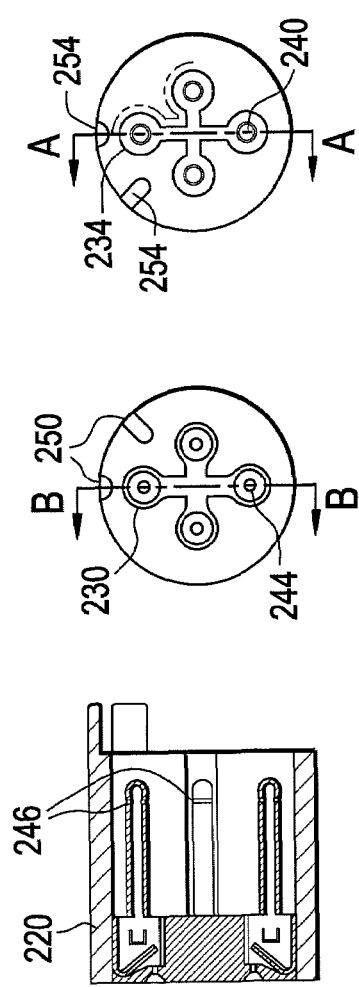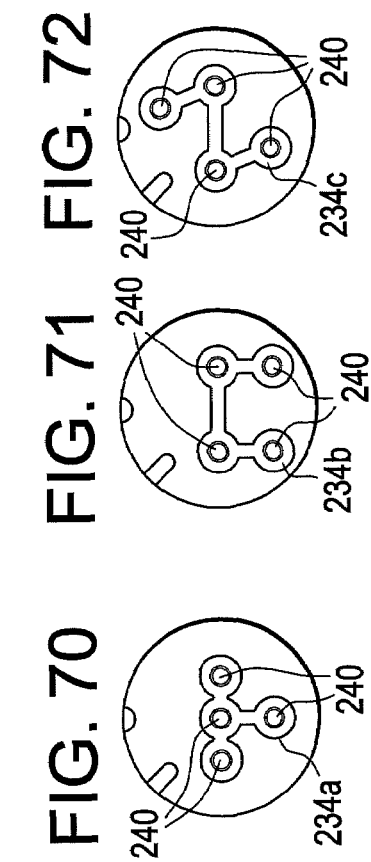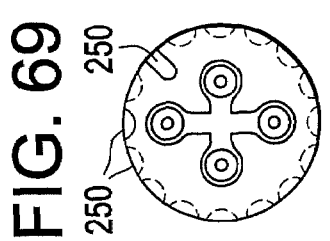

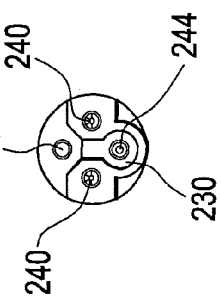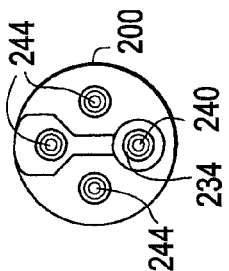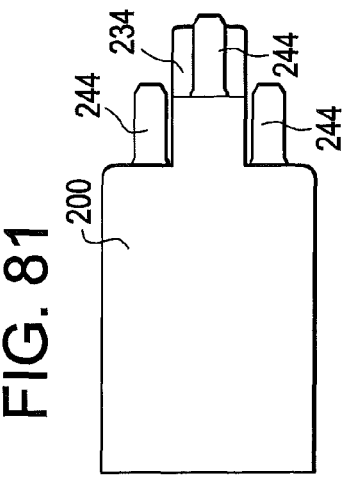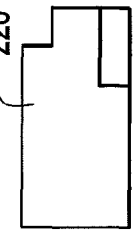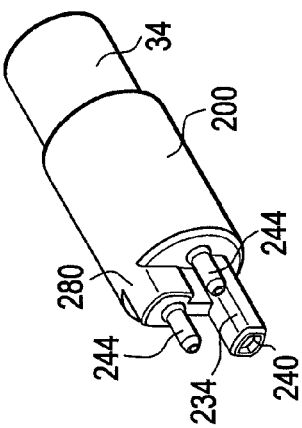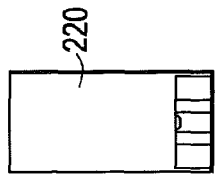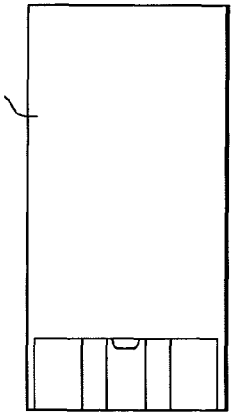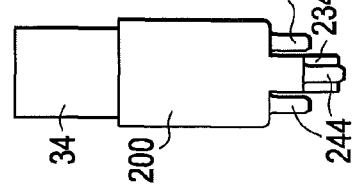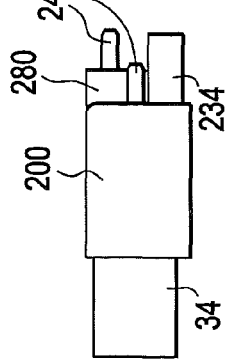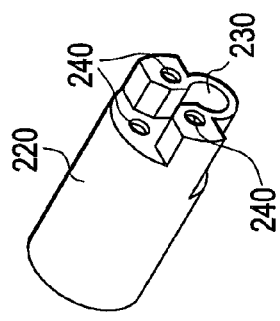

US 8,021,189 B2

ULTRAVIOLET LAMP FOR USE IN WATER PURIFIERS

CROSS REFERENCE TO RELATED APPLICATIONS

This application is a continuation in part (CIP) of U.S. application Ser. No. 11/870,256, filed Oct. 10, 2007, the contents of which are herein incorporated by reference and priority to which is hereby claimed. The 11/870,256 application is a continuation in part (CIP) of U.S. application Ser. No. 11/675,315, filed Feb. 15, 2007 which claimed the benefit of the date of earlier filed provisional application, U.S. Provisional Application No. 60/777,213, filed on Feb. 27, 2006, the contents of both of which are incorporated by reference herein, and priority to both which is hereby claimed.

BACKGROUND OF THE INVENTION

1. Field of the Invention

This invention generally relates to improvements in lamps, especially ultraviolet lamps used in air and water purifiers.

2. Description of Related Art

Ultraviolet air and water or other liquid purifiers are known for disinfecting contaminated air or water or other liquid for domestic or commercial use. Such purifiers include at least one lamp for emitting ultraviolet radiation into a chamber, duct or other apparatus such that contaminated air or water or other liquid passes over the lamp to kill microorganisms therein. In conventional manner, the lamp includes two electrodes spaced apart within an elongated arc tube containing a gas, particularly noble gas with or without additives. A pair of end caps (i.e., bases) are mounted at the ends of the tube. Each electrode contains two lead wires from the lamp seal each of which, or in some instances only one, are electrically connected to respective contact(s) or terminal pin(s). The lamp is typically inserted endwise into a sleeve installed in the water, other liquid or air purifier with or without the use of a quartz sleeve. To simplify insertion and electrical connection, the pins are conveniently mounted on one of the end caps. When the electrodes are energized by voltage from an electrical power supply, an electrical discharge is initiated in the gas between the electrodes. This discharge results from a reaction between the electrical energy, gas and mercury to produce ultraviolet radiation to be emitted from the lamp in a manner well known in the art.

An example of an ultraviolet lamp of the type described above is disclosed in U.S. Pat. No. 5,166,527 ('527), all of the contents of which are incorporated herein by reference. The '527 patent discloses a lamp, especially useful as an ultraviolet lamp for use in a water purifier, comprising an elongated, hollow arc tube extending along a longitudinal axis between opposite end regions. The tube contains a gas, preferably noble gas with or without additives. A pair of electrodes is spaced apart along the longitudinal axis. The electrodes are respectively mounted within the arc tube at the end regions thereof. A pair of end caps is respectively mounted at the end regions of the arc tube. A first electrical contact or pair of electrical contacts or terminal pins extends in mutual parallelism along the longitudinal axis and is electrically connected to one or both of the electrode lead wires. A second electrical contact or pair of electrical contacts or terminal pins extends in mutual parallelism along the longitudinal axis and is electrically connected to one or both of the other of the electrode lead wires. Both pairs of pins are mounted on, and extend outwardly along the longitudinal axis of, one of the end caps. A wire conductor is, or two wire conductors are, located exteriorly of the tube and electrically connected to one pin or one pair of pins at one end region of the tube, as well as to the electrode at the other end region of the tube.

Two embodiments of the lamp disclosed in the '527 patent are shown in prior art FIGS. 1 and 2. As shown in FIGS. 1 and 2, the pairs of pins are offset relative to each other along the longitudinal axis. This offset resists the formation of an electrical arc between the pairs of pins exteriorly of the arc tube, especially in the presence of the moisture-laden, humid environment of the water purifier.

Still referring to prior art FIGS. 1 and 2, the one end cap has a stepped outer end wall having a pair of wall portions lying in mutual parallelism in planes generally perpendicular to the longitudinal axis. The first pair of pins is supported on, and extends through, one of the end wall portions for a predetermined distance, and the second pair of pins is supported on, and extends through, the other of the end wall portions for the same predetermined distance. The planes of the end wall portions are spaced apart by a predetermined spacing larger than said predetermined distance in order to still further prevent electrical arcing between the pairs of pins exteriorly of the arc tube. A barrier wall internally of the one end cap physically separates the electrical connections to the two pairs of pins to resist the formation of an electrical arc between the pairs of pins interiorly of the one end cap. The barrier wall is advantageously made of the same non-conductive material as the one end cap.

In addition to the two-tiered stepped bases of the '527 patent, other multi-tiered bases have been manufactured including those bases shown in prior art FIGS. 3-7.

Although well-suited for their intended purposes, there continues to be a need for improved lamp base designs, particularly ultraviolet lamps.

There are many different types of lamps that have a base or end cap that can be connected with a socket to provide electrical connections to the lamps. The end cap and socket must be constructed to permit easy replacement of the lamp while securely holding the lamp. This may be particularly important in certain applications where vibration or movement of the lamp or lamp fixture could result in unintentional separation between the lamp's end cap and the socket. Additionally, the electrical connections must remain secure.

In some applications where a multiplicity of contact pins and/or pin orientations is utilized, it is often difficult to align the contact pins to make the electrical connection necessary to operate the lamp. Often, the contact pins may become misaligned or bent due to their extension or projection from the base of the lamp, preventing their insertion into a socket. It may also be possible to insert the end cap into a socket such that the contacts are not connected with the proper terminals in the socket, resulting in improper operation of the lamp. Also, on a typical "slide into place" male/female pin connector there is no locking or twist locking and thus the pins may slide out and become disconnected easily by vibration for example.

An example of an ultraviolet lamp of the type described above is disclosed in U.S. Pat. No. 5,166,527 ('527), which uses a stepped base with pins connector, all of the contents of which are incorporated herein by reference. The '527 patent discloses a lamp or bulb, used as an ultraviolet lamp for use in an air or water purifier, comprising an elongated, hollow arc tube extending along a longitudinal axis between opposite end regions. The tube contains a gas, preferably noble gas with or without additives. A pair of electrodes is spaced apart along the longitudinal axis. The electrodes are respectively mounted within the arc tube at the end regions thereof. A pair of end caps is respectively mounted at the end regions of the arc tube. A first electrical contact or pair of electrical contacts or terminal pins extends in mutual parallelism along the longitudinal axis and is electrically connected to one or both of the electrode lead wires. A second electrical contact or pair of electrical contacts or terminal pins extends in mutual parallelism along the longitudinal axis and is electrically connected to one or both of the other of the electrode lead wires. Both pairs of pins are mounted on, and extend outwardly along the longitudinal axis of, one of the end caps. A wire conductor is, or two wire conductors are, located exteriorly of the tube and electrically connected to one pin or one pair of pins at one end region of the tube, as well as to the electrode at the other end region of the tube. This design is mainly designed to prevent electrical arcing and does not lock in place.

As noted in WO/2006/136026 to Elku et al. which is a variation of the slide-on pin connector above, a potential problem with this approach is that in many applications, the radiation lamp is immersed in a flow of water and turbulence created within that water treatment system invariably imparts a vibratory motion to the lamps. This frequently results in the lamp being vibrated or shaken loose of its electrical connection base or socket thereby causing the lamp to be rendered completely or intermittently inoperative. When such an event occurs, the water being treated may not be fully disinfected. The prior art has attempted to address this problem by using a relatively complicated mechanical connection (e.g., a so-called "push-and-twist" connection) to secure the lamp to the connection base. See, for example, U.S. Pat. No. 5,422,487 to Sauska et al. and U.S. Pat. No. 6,884,103 to Kovacs. The potential problem with these approaches is the complexity of the mechanical connection between the lamp and the base unit requiring the use of springs, specialized connection lugs and the like. Further, a connection system which is predicated on a dual motion system such that pushing and twisting if used incorrectly for example may give rise to higher incidents of lamp breakage, electrical shock, and other damage to the lamp by field personal. Therefore, eliminating a forceful "push" necessary to deflect a heavy locking spring in a "push and twist" lock would be beneficial because the typically glass lamp would be subject to reduced force and stress.

Also, it is important that lamps of proper wattage be used for safety, heat, and fire concerns. Thus, a unique keying system that only allows lamps of proper wattage to be inserted into the base will also help safety.

Accordingly, there remains the need in the art for a safety lamp device, particularly a radiation lamp, which will provide a reliable, locking, and secure from movement, electric connection, yet be relatively inexpensive, uncomplicated, durable, rugged, and simple to implement with smooth operation and with reduced force and stress on the lamp for safety purposes. Also, a lamp that reduces the chance of electrical shock is needed for safety purposes.

Thus, there continues to be a need for improved lamp base designs, particularly ultraviolet lamps.

SUMMARY OF THE INVENTION

In accordance with at least an embodiment of the present invention, a lamp is provided having at least one female terminal pin mounted on and extending outwardly along a longitudinal axis of an end cap, also known as the base, of the lamp. The pins may be offset relative to one another along the longitudinal axis.

The above-described end cap configuration for the lamp may be mated to a complimentary shaped receptacle known as a socket. The socket may be wired to a power source.

The utilization of one at least one female terminal pin located on the lamp base leads to improved lamp configurations in that polarization between the pairs of pins are more easily ensured; and the mating of the end cap and receptacle may be stronger. The designs will further allow for matching of the lamp and connector to a specific power supply to reduce the chance of connecting an ultraviolet lamp into an improperly matched power supply.

The lamp of this invention is preferably an ultraviolet lamp and finds particular application for use in a water, other liquid, or air purifier.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a perspective elevation view of a first embodiment of an end cap for a lamp in accordance with the present invention;

FIGS. 11-14 are perspective elevation views of second, third, fourth and fifth embodiments of end caps in accordance with the present invention;

FIGS. 15-19 are perspective elevation views of sockets for the end caps of FIGS. 10-14, respectively;

FIGS. 20-24 are perspective elevation views of additional embodiments of end caps having female recesses in accordance with yet other embodiments of the present invention; and FIGS. 25-29 are perspective elevation views of sockets for the end caps of FIGS. 20-24, respectively.

FIG. 62 is a perspective view of a socket comprising male pin connectors according to at least an embodiment of the present invention.

FIG. 63 is a perspective view of a lamp base comprising at least one female pin connector according to at least an embodiment of the present invention.

FIG. 64 is an exploded perspective view of an assembly of a lamp with a lamp base and a socket according to at least an embodiment of the present invention.

FIGS. 65-66 are various views of a socket comprising male pin connectors according to at least an embodiment of the present invention.

FIGS. 67-68 are various views of a lamp base comprising at least one female pin connector according to at least an embodiment of the present invention.

FIG. 69 is a top plan view of a socket comprising male pin connectors and keys.

FIGS. 70-74 are top plan views of a lamp base showing at least some possible configurations of pin connectors according to at least an embodiment of the present invention.

FIGS. 75-78 are various views of a lamp base comprising at least one female pin connector and at least one male pin connector according to at least an embodiment of the present invention.

FIGS. 79-84 are various views of a socket comprising at least one female pin connector and at least one male pin connector according to at least an embodiment of the present invention.

FIG. 81 is a side view of a lamp base comprising at least one female pin connector and at least one male pin connector according to at least an embodiment of the present invention.

FIG. 82 is a side view of a socket comprising at least one female pin connector and at least one male pin connector according to at least an embodiment of the present invention.

DETAILED DESCRIPTION OF THE PREFERRED EMBODIMENTS

Figure 1:
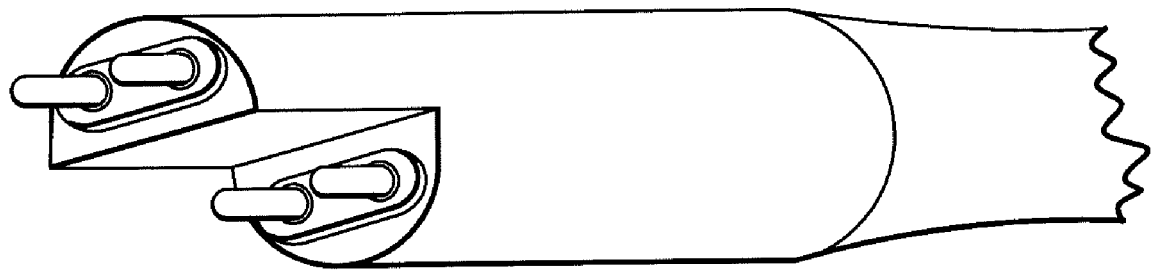
FIGS. 1-7 are respective views of end caps used in ultraviolet lamps in accordance with the prior art.
Figure 2:
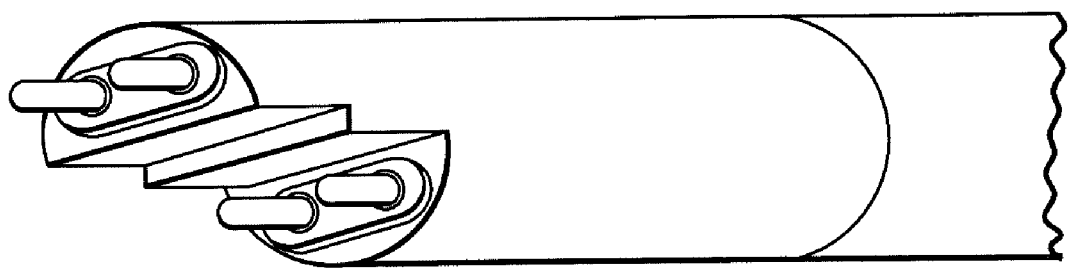
Figure 7:
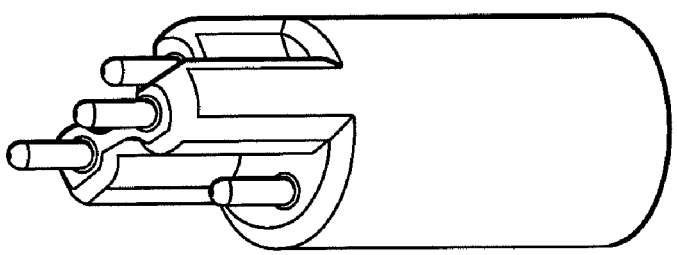
Figure 6:
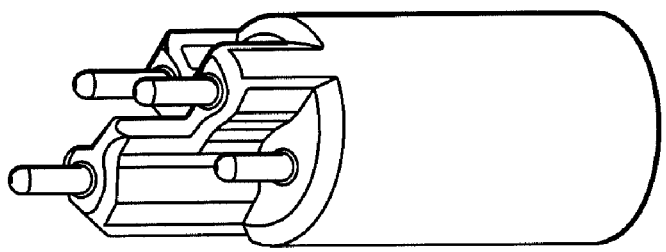
Figure 5:
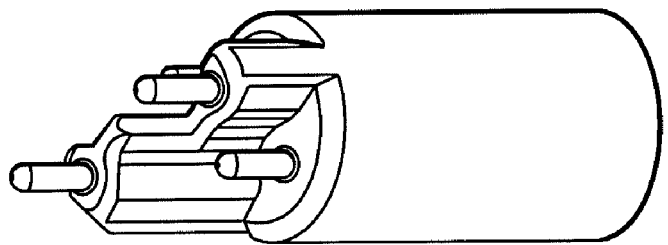
Figure 4:
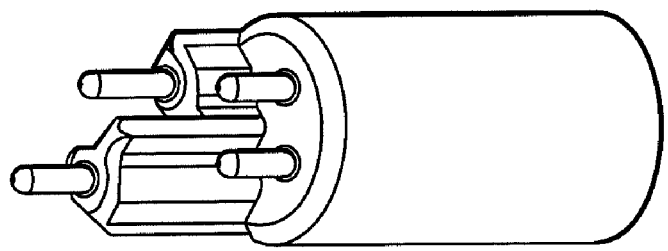
Figure 3:
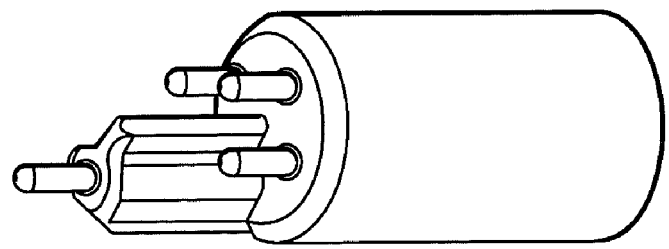
Figure 8:
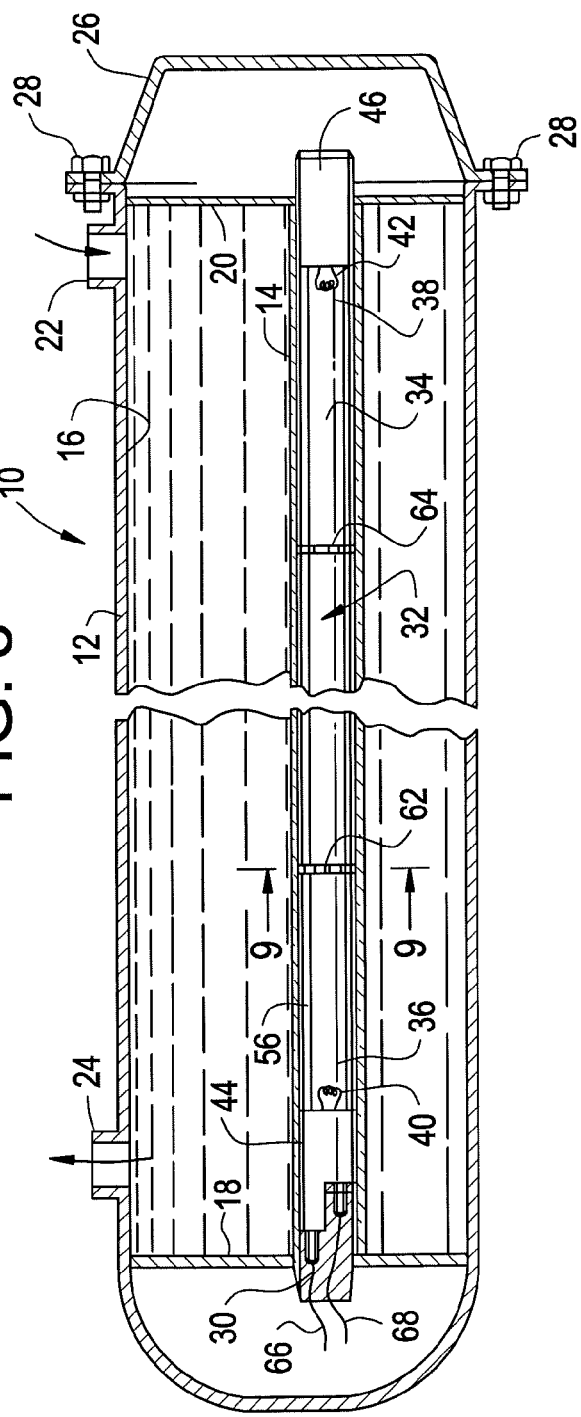
FIG. 8 is a cross-sectional view along the longitudinal axis of a water purifier employing the ultraviolet lamp in accordance with the present invention.

Referring now to FIG. 8 of the drawings, reference numeral 10 generally identifies a water purifier having a cylindrical housing 12 extending along a longitudinal axis. A hollow, axially-extending sleeve 14 is centrally mounted within the housing 12 between apertured support walls 18, 20 spaced apart along the longitudinal axis. The support walls 18, 20, together with the interior wall of the housing 12 and the exterior wall of the sleeve 14, bound an interior space 16. A water inlet 22 admits pressurized water to be purified into the space 16. A water outlet 24 discharges the purified water from the space 16. The space 16 serves as a flow-through passage for the water contained therein which, during the course of its flow, is exposed to ultraviolet radiation as described below.

A removable cover 26 overlies the support wall 18 at one end of the housing 12. The cover 26 is detachably coupled to the housing 12 by a set of threaded fasteners 28 to permit access to the interior of the sleeve 14 through the aperture of the support wall 18. An electrical socket 30 is removably mounted within the aperture of the support wall 18. An ultraviolet lamp 32 in accordance with this invention is slidably inserted into the interior of the sleeve 14 through the aperture of the support wall 18. An electrical connection, as described below, is made with the socket 30. In operation, the lamp 32 emits ultraviolet radiation of sufficient intensity to kill microorganisms in the water, other liquid or air contained in the space 16 to purify the same for domestic and commercial applications.

The lamp 32 includes an elongated, hollow, sealed, arc tube 34 constituted of a light-transmissive material, e.g. silica quartz or other ultraviolet transmitting glass tube. The tube 34 has opposite end regions 36,38 spaced apart along the longitudinal axis. A gas, preferably mercury vapor with or without additives, is sealingly contained within the tube.

A pair of electrodes 40, 42 is respectively mounted within the tube at the end regions 36, 38. A pair of end caps 44, 46 constituted of a non-conducting material, e.g. ceramic, is respectively mounted at the end regions 36, 38 over the sealed end regions of the tube. Each end cap has a bore having a closed base against which a sealed end region of the tube abuts when the sealed end region is inserted fully into a respective end cap. End cap 44 (best show in FIGS. 10 and 10A) also has a barrier wall 70a, 70b, extending between semi-circular bases 72, 74 such that bases 72, 74 are stepped with base 72 being the upper or distal base and base 74 being the lower or proximal base. In accordance with an important feature of this invention, a male member 75 extends laterally from barrier wall 70a, 70b, along lower base 74. Member 75 is centrally positioned along wall 70a, 70b thus splitting the wall into the two sections 70a and 70b. Member 75 has a height which is equal to the distance between respective bases 72 and 74. Member 75 also acts to divide lower base 74 into two symmetrical sections (each comprising an approximately 90 degree quadrant).

Figure 10A:
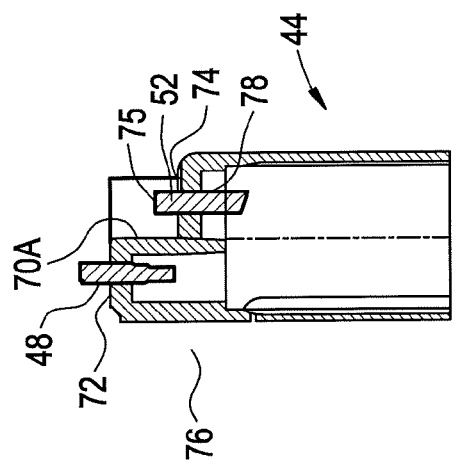
FIG. 10A is a cross-sectional elevation view along the line 10A-10A of FIG. 10.
Figure 9:
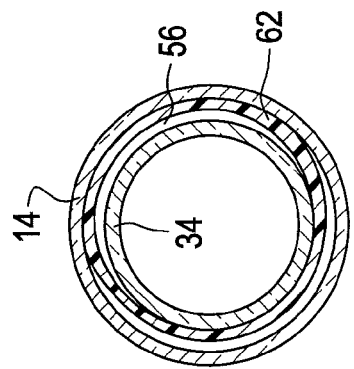
FIG. 9 is a cross-sectional elevation view along the line 9-9 of FIG. 8.
Figure 30:
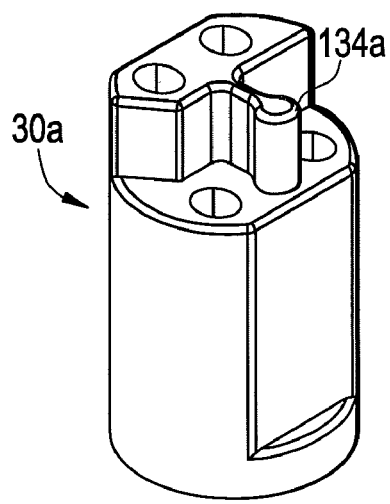
FIGS. 30-31 are perspective views of an embodiment of a socket useable with the lamp base shown in FIGS. 38-45.
Figure 31:
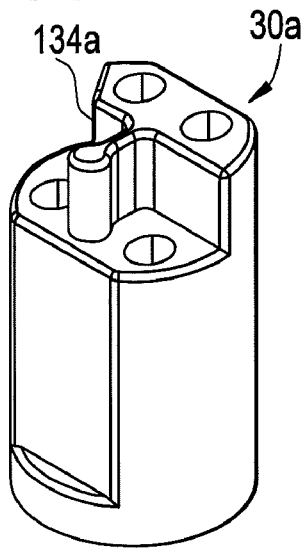
Figure 32:
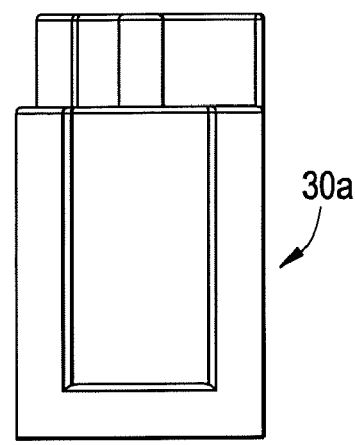
FIGS. 32-35 are side views of the embodiment shown in FIGS. 30-31.
Figure 33:
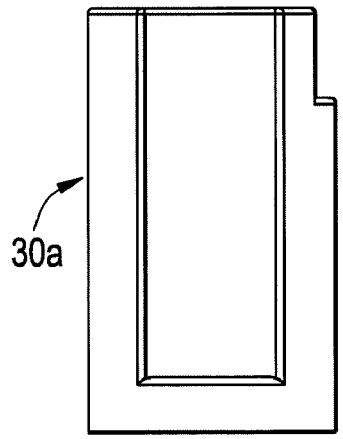
Figure 34:
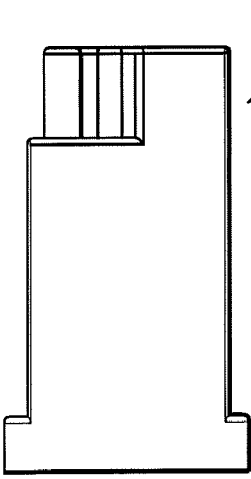
Figure 35:
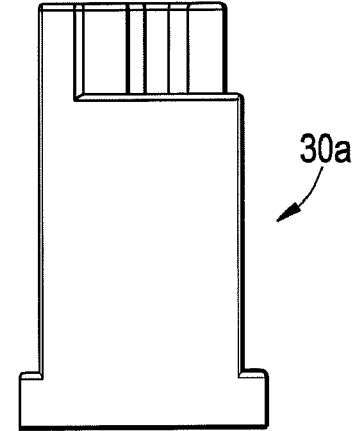
Figure 36:
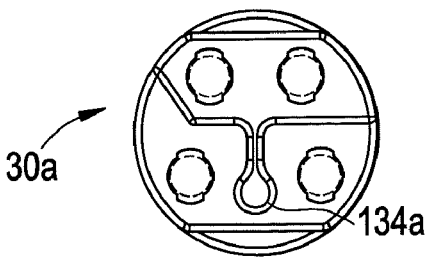
FIG. 36 is a top plan view of the embodiment shown in FIGS. 30-35
Figure 37:
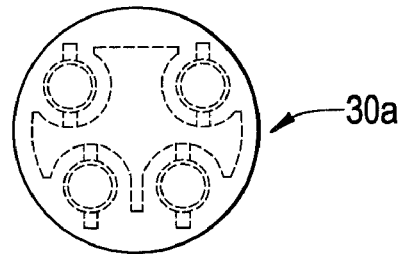
FIG. 37 is a bottom plan view of the embodiment shown in FIG. 30-35.

Still referring to FIG. 10, a first pair of electrical contacts or terminal pins 48, 50 extends in mutual parallelism along the longitudinal axis, and is mounted on, and extends outwardly of, the end cap 44 (through base 72). A second pair of electrical contacts or terminal pins 52, 54 also extends in mutual parallelism along the longitudinal axis, and is also mounted on, and extends outwardly of, the same end cap 44 (through base 74). Pins 52 and 54 are separated from one another by member 75. The pins 48, 50 extend into interior compartment 76, and the pins 52, 54 extend into compartment 78 (see FIG. 10A).

The pins 48, 50 are electrically connected within end cap 44 to one end of a wire conductor 56. The conductor 56 is located exteriorly of the tube 34, and extends along the longitudinal axis to the opposite end cap 46 wherein the other end of the conductor 56 is connected to the electrode 42. The pins 52, 54 are electrically connected within the end cap 44 to the electrode 40. The barrier wall 70a, 70b physically separates the pairs of pins.

Thus, as shown in FIG. 10, the end cap 44 has a stepped, outer end wall having a pair of semi-circular end wall portions 72, 74 lying in mutual parallelism in planes generally perpendicular to the longitudinal axis. As best shown in FIG. 15, the socket 30 has a complementary stepped, outer end wall together with a centrally located recess 76. During mating, the pins 48, 50, 52, 54 will be received into respective sockets 78, 80, 82, 84 while member 75 is received into mating recess 76.

A set of centering rings 62, 64, preferably constituted of a synthetic plastic material, is located on tube 34, being placed thereon before the end caps are attached to the end regions of the tube 34. The rings 62, 64 coaxially surround the tube 34 and frictionally engage and support the tube, and assist in centering the tube within sleeve 14.

Referring now to FIGS. 11-14, additional embodiments of the end cap depicted in FIG. 10 are shown. All of these end caps have a similar configuration to that shown in FIG. 10 including a pair of parallel but longitudinally displaced semi-circular bases 72, 74 having a barrier wall 70a, 70b, extending therebetween so as to form a stepped base. In addition and in accordance with the present invention, a male member or extension extends centrally outwardly from barrier wall 70a, 70b. While this male extension was in the form of a relatively thin wall 75 in the end cap 44 of FIG. 10, the male extension takes on a differing geometric shape in the various embodiments shown in FIGS. 11-14. More specifically, the end cap 86 in FIG. 11 has a rounded arcuate shape (e.g., V-shaped, semi-circular shaped) extension 102 extending between barrier wall sections 70a and 70b. The end cap 88 in FIG. 12 has an extension 104 in the shape of a rectangular box which includes a pair of opposed sidewalls 106, 108 which extend outwardly from and perpendicularly to respective barrier wall sections 70a and 70b. The end cap 90 of FIG. 13 also has a box like extension 110 which is similar to extension 104 (in FIG. 12); however, extension 112 has a more square cross-section relative to the rectangular cross-section of extension 104. Thus, the barrier wall sections 70a and 70b in FIG. 13 are relatively larger than the respective barrier wall sections 70a and 70b in FIG. 12. End cap 92 in FIG. 14 is a V-shaped triangular shape extension member 112 which forms the divider between barrier wall sections 70a and 70b.

Significantly, all of the additional embodiments of FIGS. 11-14 have in common the feature of FIG. 10 wherein a male member extends outwardly from barrier wall 70a, 70b, and is coextensive with stepped (that is longitudinally displaced) base sections 72, 74. It will be appreciated that in accordance with this invention, the male member may have any suitable configuration besides those shown in FIGS. 10-14 and that such configuration may be symmetrical, asymmetrical, spherical, conical, aspheric or any other desired shapes.

As in the receptacle 30 shown in FIG. 15 which receives the end cap 44 in FIG. 10, the end caps of the embodiments of FIGS. 11-14 have similarly complimentary shaped respective receptacles 94, 96, 98 and 100 as shown in FIGS. 16-19, respectively. Thus, receptacle 94 of FIG. 16 has a rounded arcuate shaped recess 114 for receiving and mating with rounded or U-shaped extension 102 in FIG. 11. Similarly, receptacle 96 has a rectangular shaped recess 116 which is sized and configured to mate with and be received by rectangular extension 104 in FIG. 12. Receptacle 98 in FIG. 18 has a square shaped recess 118 for mating with and being received by square shaped extension 110 in FIG. 13 while receptacle 100 of FIG. 19 has a V-shaped recess 120 for mating with and being received by V-shaped extension 112 in FIG. 14. Again, it will be appreciated that the receptacles of FIGS. 15-19 may include a recess having any desired shape, so long as the shape is complimentary to, and can be received by, the shape of the extensions in the mating end cap.

In still another alternative embodiment of the present invention, it will be appreciated that the male extension in the plug ended lamp and the female recess in the complimentary receptacle may be reversed such that the lamp cap will exhibit the recess while the receptacle will exhibit the complimentary male extension for mating with the recess in the cap. Such alternative configurations are shown in the end caps of FIGS. 20-24 and also in FIGS. 38-45. The end caps of FIGS. 20-24 and 38-45 are similar to the respective end caps shown in FIGS. 10-14 with the only difference being that the male extension has been substituted with the female recess in FIGS. 20-24. Thus, end cap 44' includes a narrow recess 122 (similar to the recess 76 shown in FIG. 15), end cap 86' and 86a include an arcuate shaped recess 124, 124a (similar to the recess 114 in FIG. 16), end cap 88' includes a rectangularly shaped recess 126 (similar to the recess 116 in FIG. 17), end cap 90' of FIG. 23 includes a square shaped recess 128 (similar to the recess 118 in FIG. 18) and end cap 92' of FIG. 24 includes a V-shaped recess 130 (similar to the V-shaped recess 120 of FIG. 19).

Figure 38:
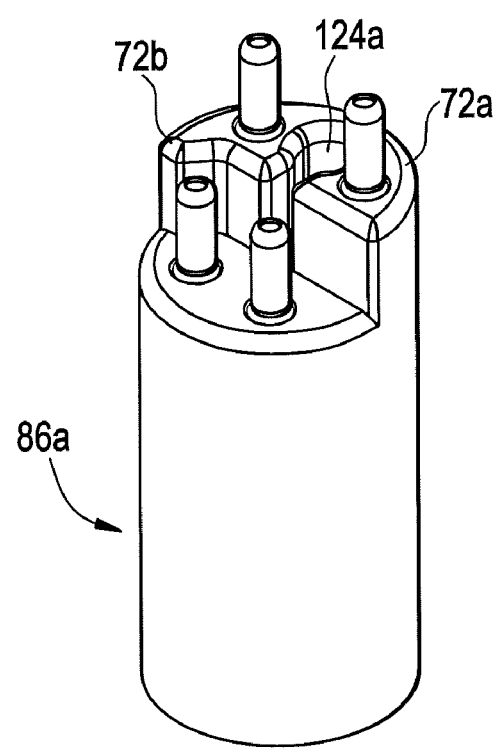
FIGS. 38-39 are perspective views of a lamp base useable with the socket of shown in FIGS. 30-37.
Figure 39:
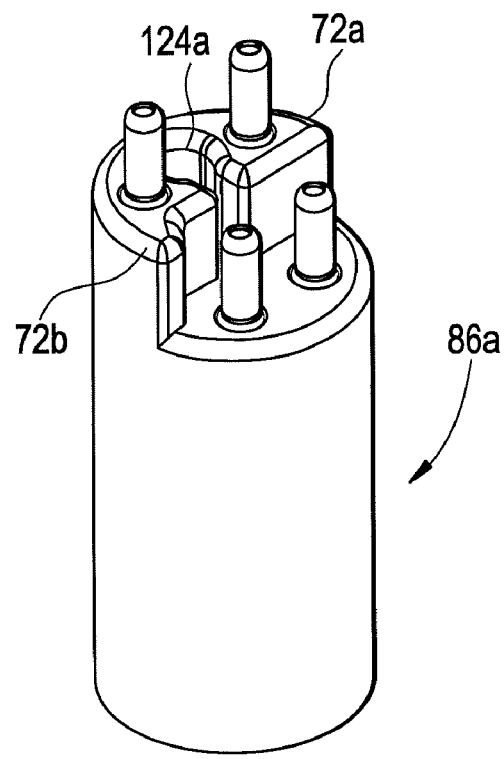
Figure 40:
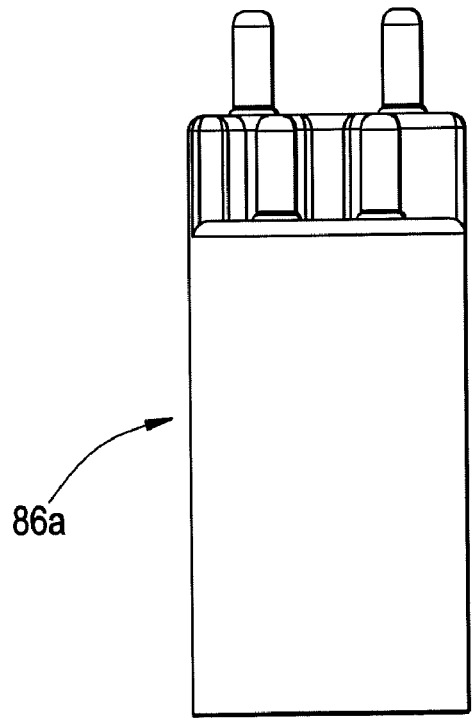
FIGS. 40-43 are side views of the base shown in FIGS. 38-39.
Figure 41:
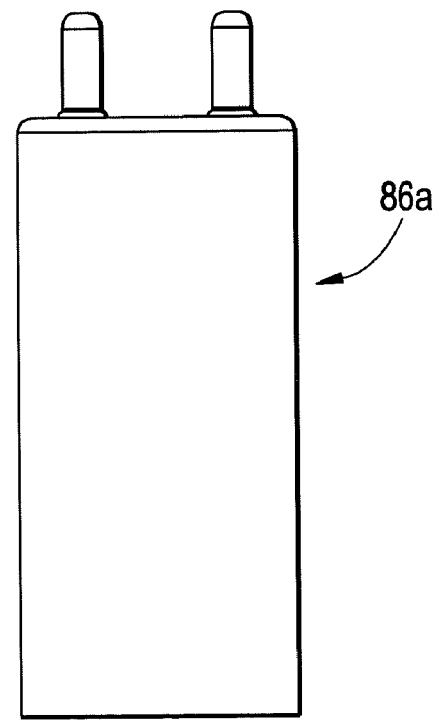
Figure 42:
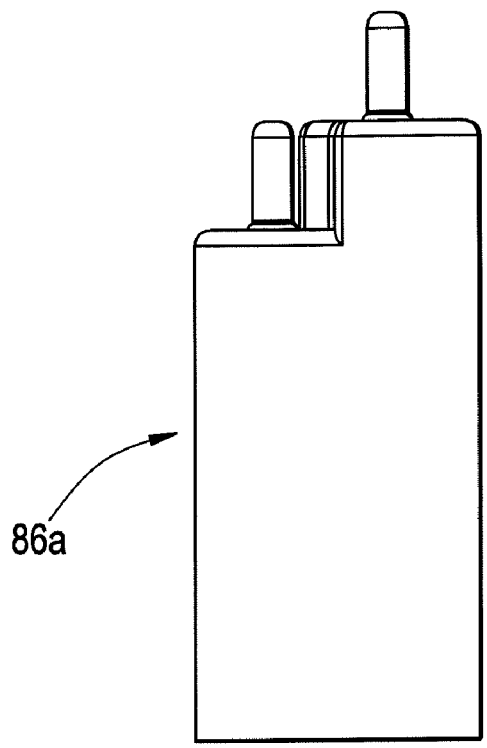
Figure 43:
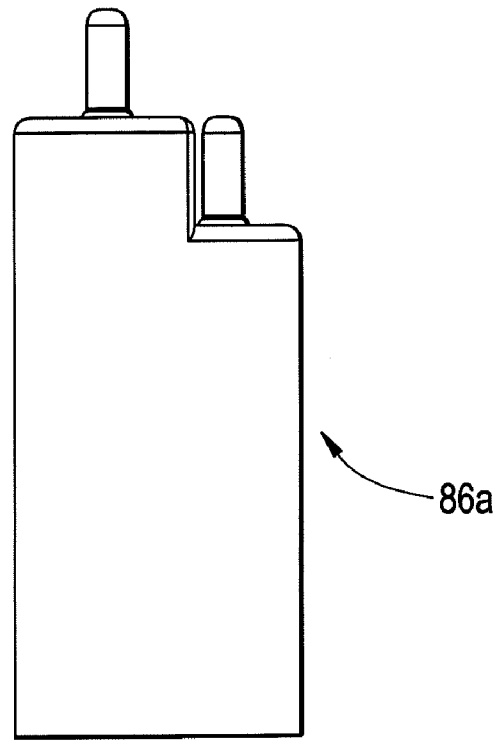
Figure 44:
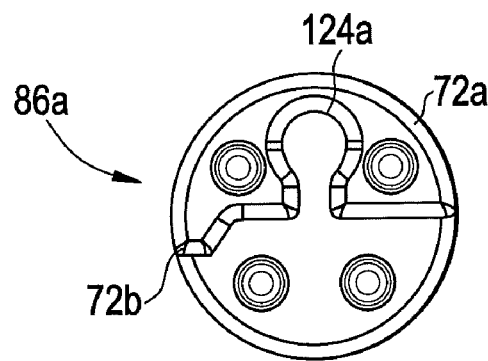
FIG. 44 is a top plan view of the base shown in FIGS. 38-43
Figure 45:
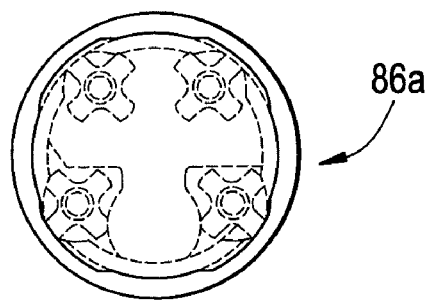
FIG. 45 is a bottom plan view of the base shown in FIGS. 38-44.
Figure 46:
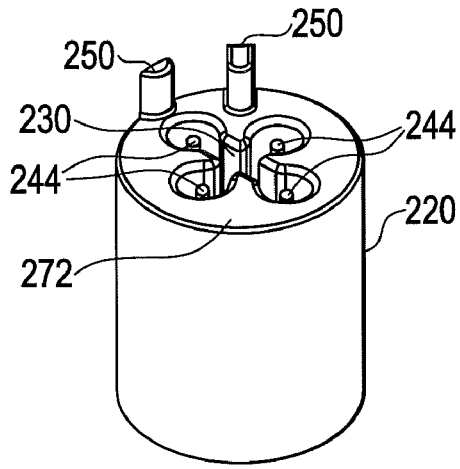
FIGS. 46-53 are various views of a socket comprising male pin connectors according to at least an embodiment of the present invention.
Figure 47:
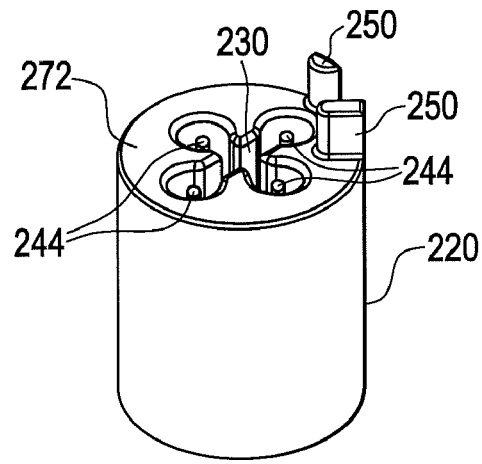
Figure 48:
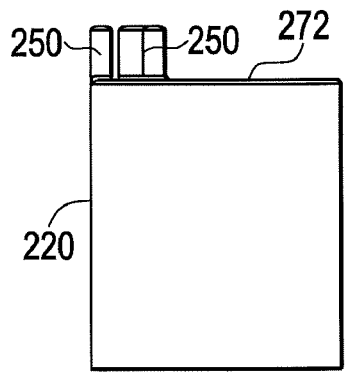
Figure 49:
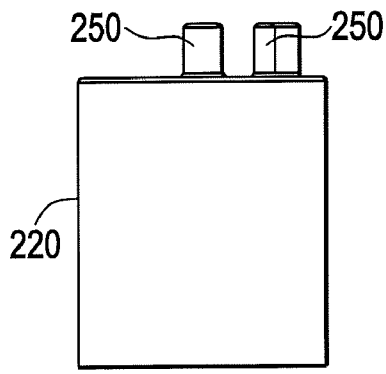
Figure 50:
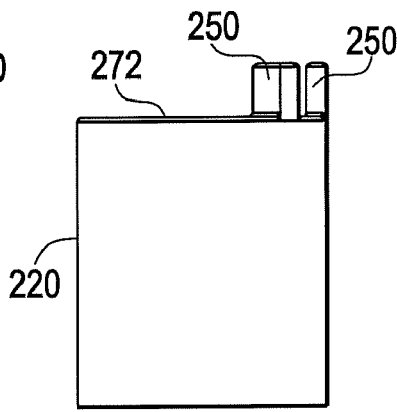
Figure 51:
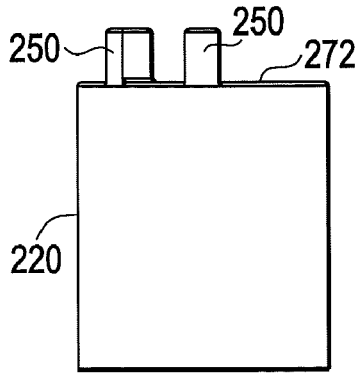
Figure 52:
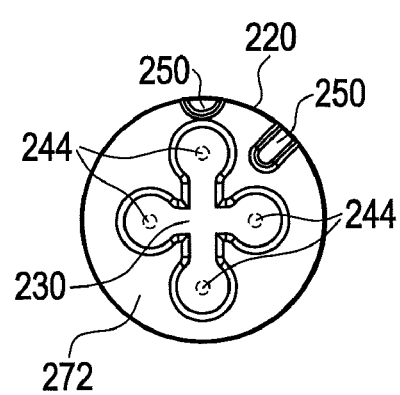
Figure 53:
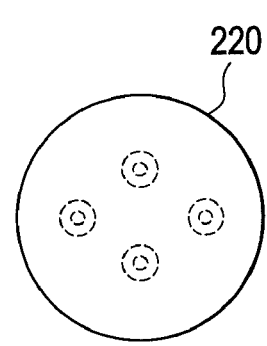
Figure 54:
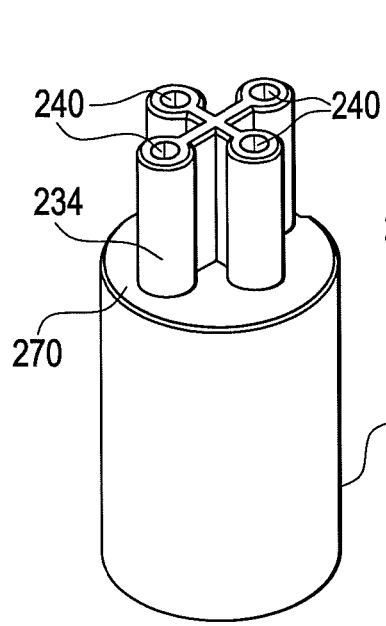
FIGS. 54-61 are various views of a lamp base comprising at least one female pin connector according to at least an embodiment of the present invention.
Figure 55:
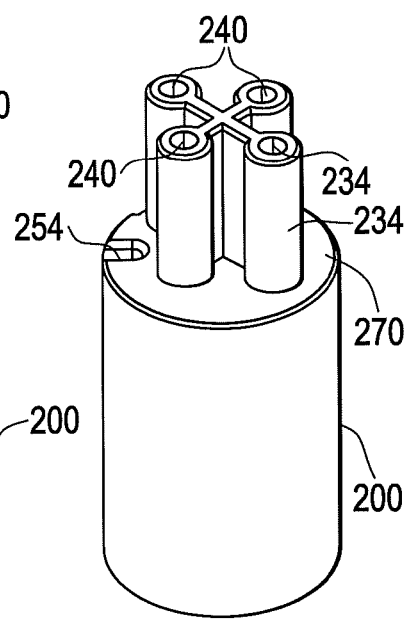
Figure 56:
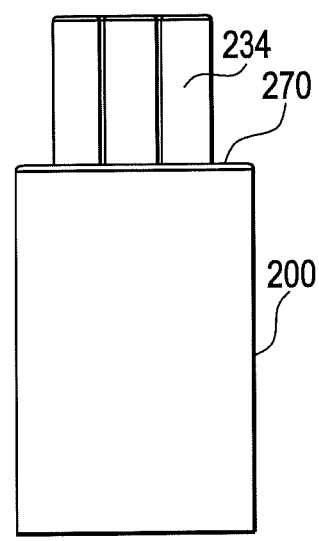
Figure 57:
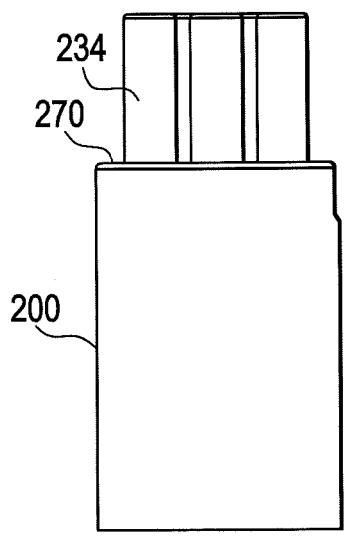
Figure 58:
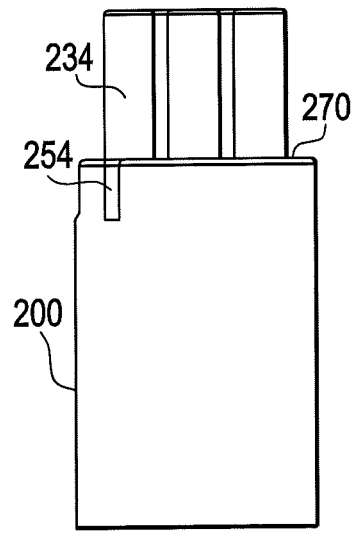
Figure 59:
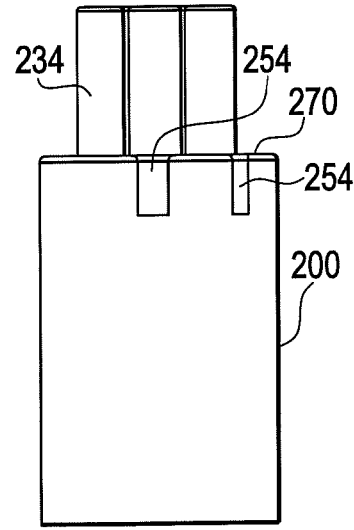
Figure 60:
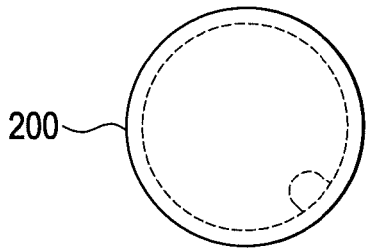
Figure 61:
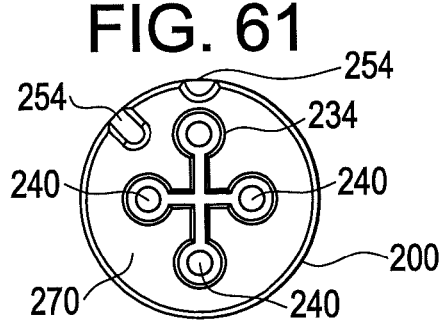
Figure 85:
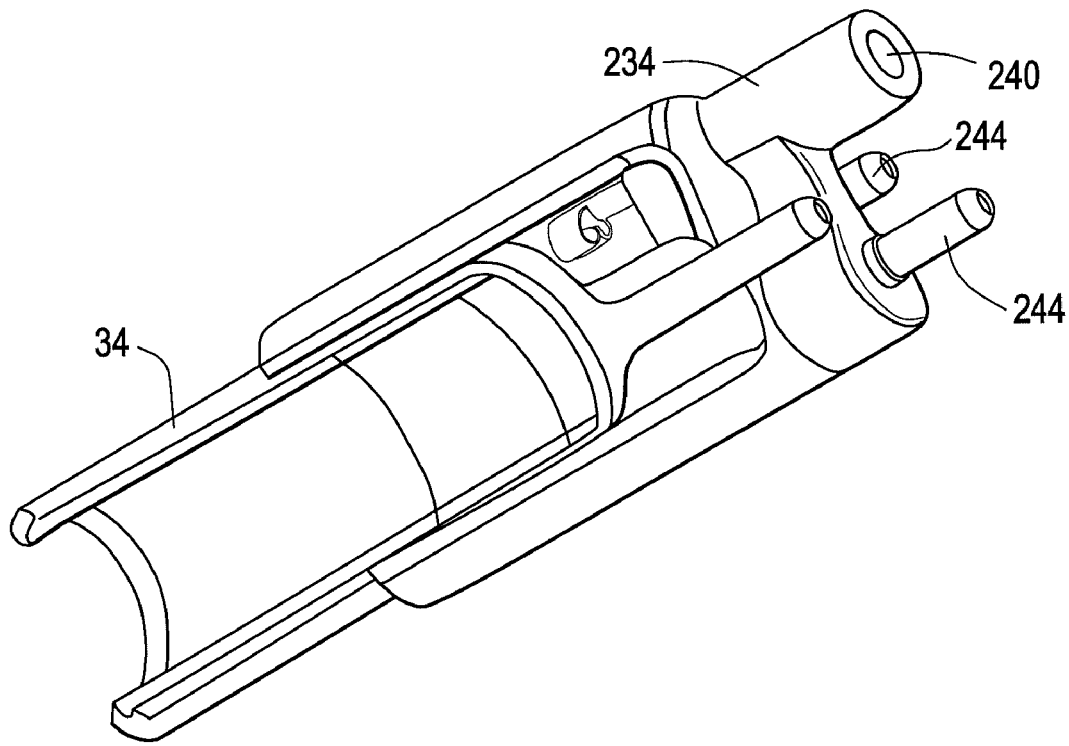
FIG. 85 is a perspective view of a lamp base comprising at least one female pin connector and at least one male pin connector according to at least an embodiment of the present invention.
Figure 86:
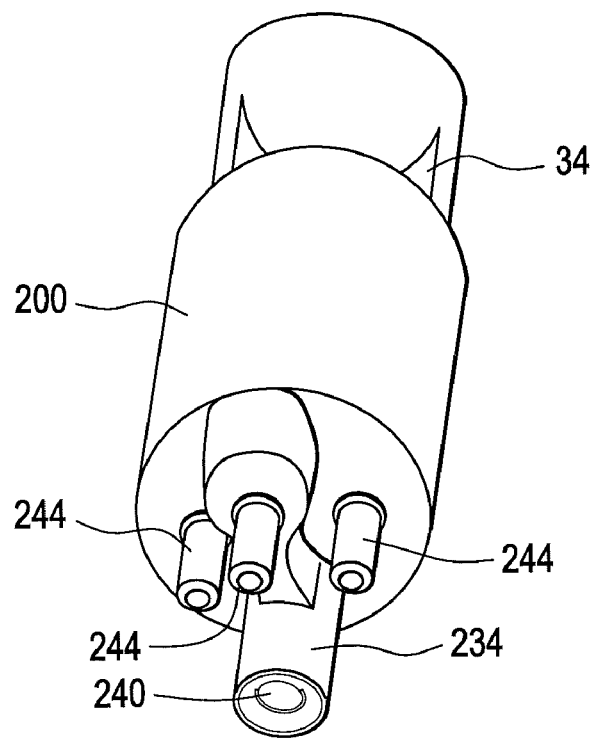
FIG. 86 is a perspective view of a lamp base comprising at least one female pin connector and at least one male pin connector according to at least an embodiment of the present invention.
Figure 87:
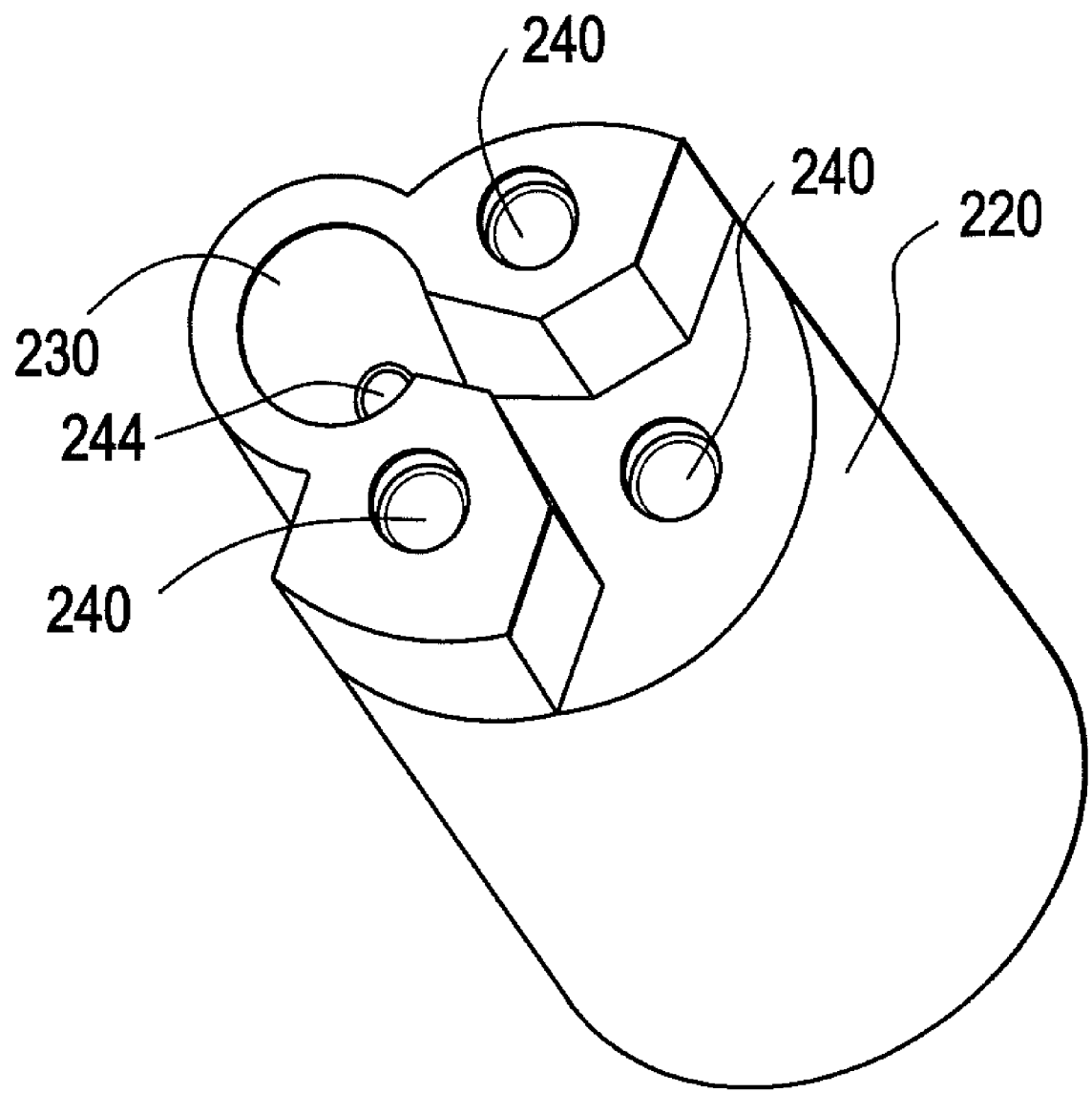
FIG. 87 is a perspective view of a socket comprising at least one female pin connector and at least one male pin connector according to at least an embodiment of the present invention.
Figure 88:
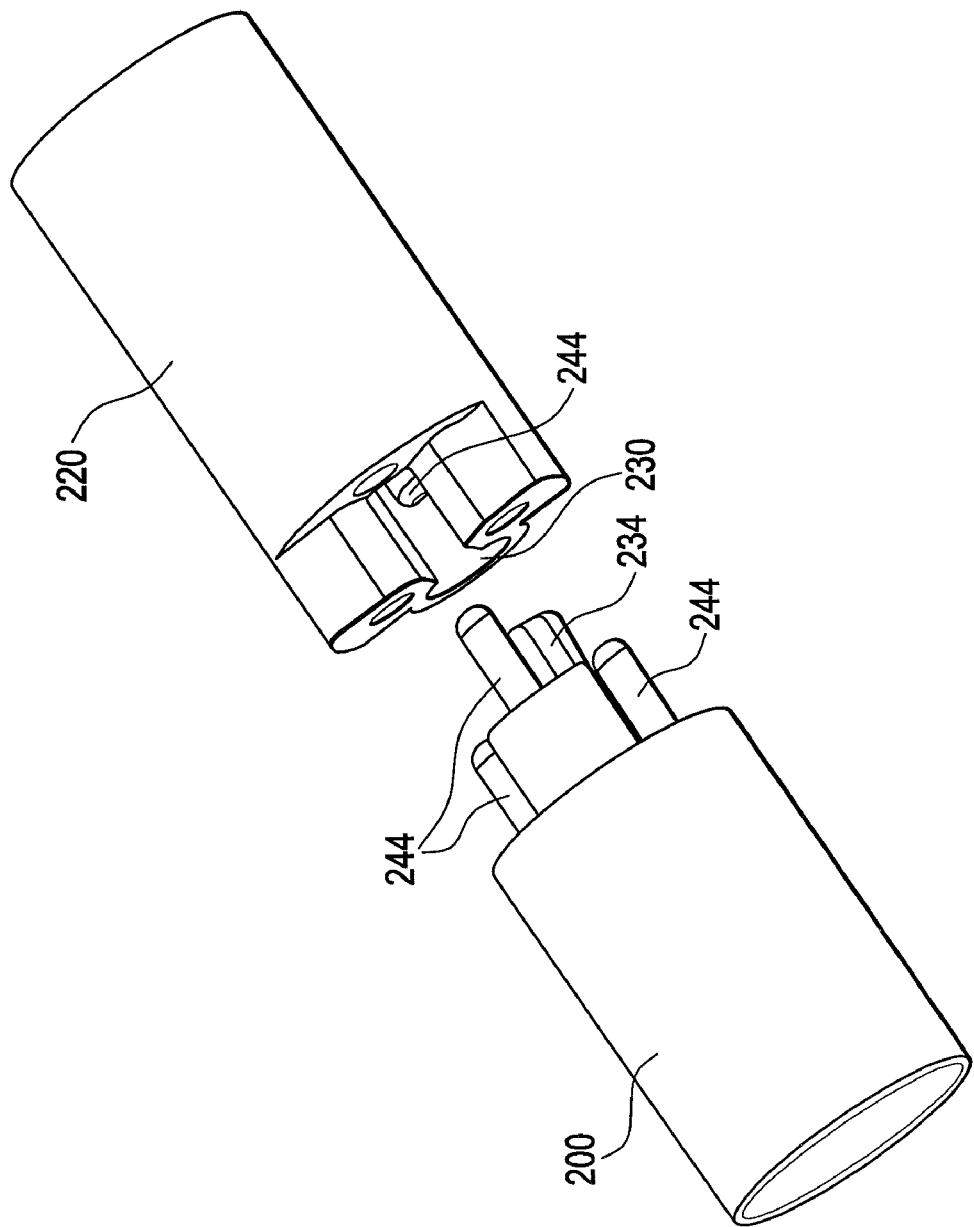
FIG. 88 is a perspective view of a lamp base and a socket according to at least an embodiment of the present invention.
Figure 89:
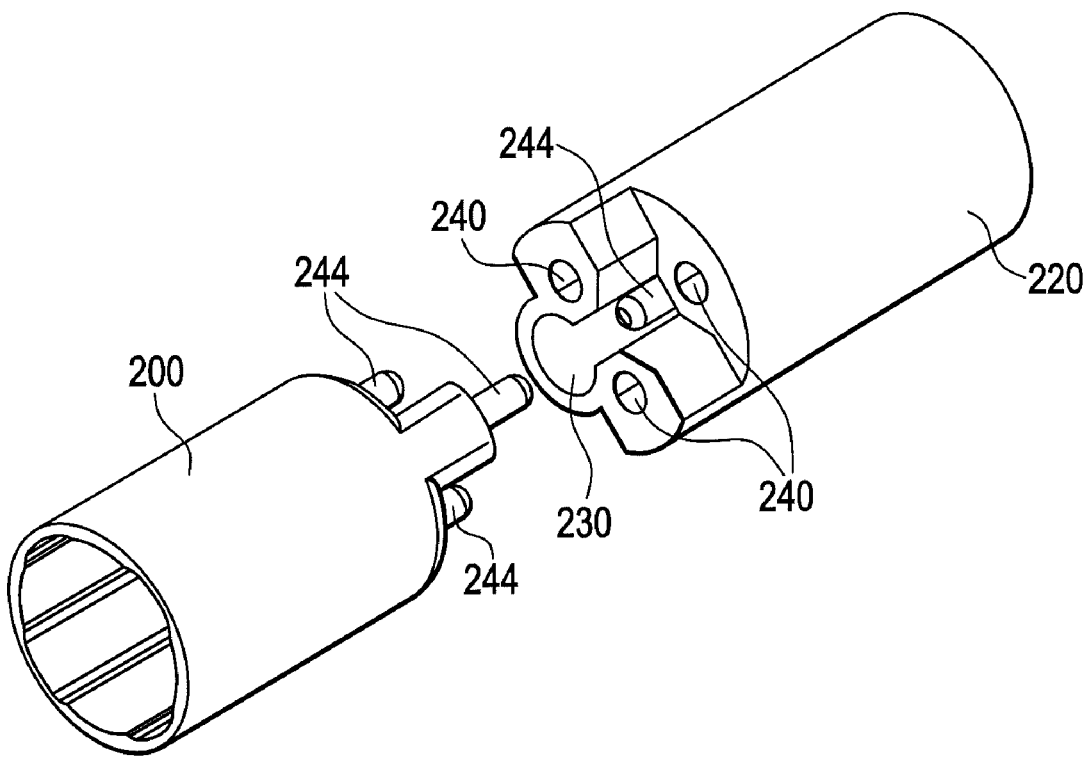
FIGS. 89-90 are perspective views of a lamp base and a socket according to at least an embodiment of the present invention.
Figure 90:
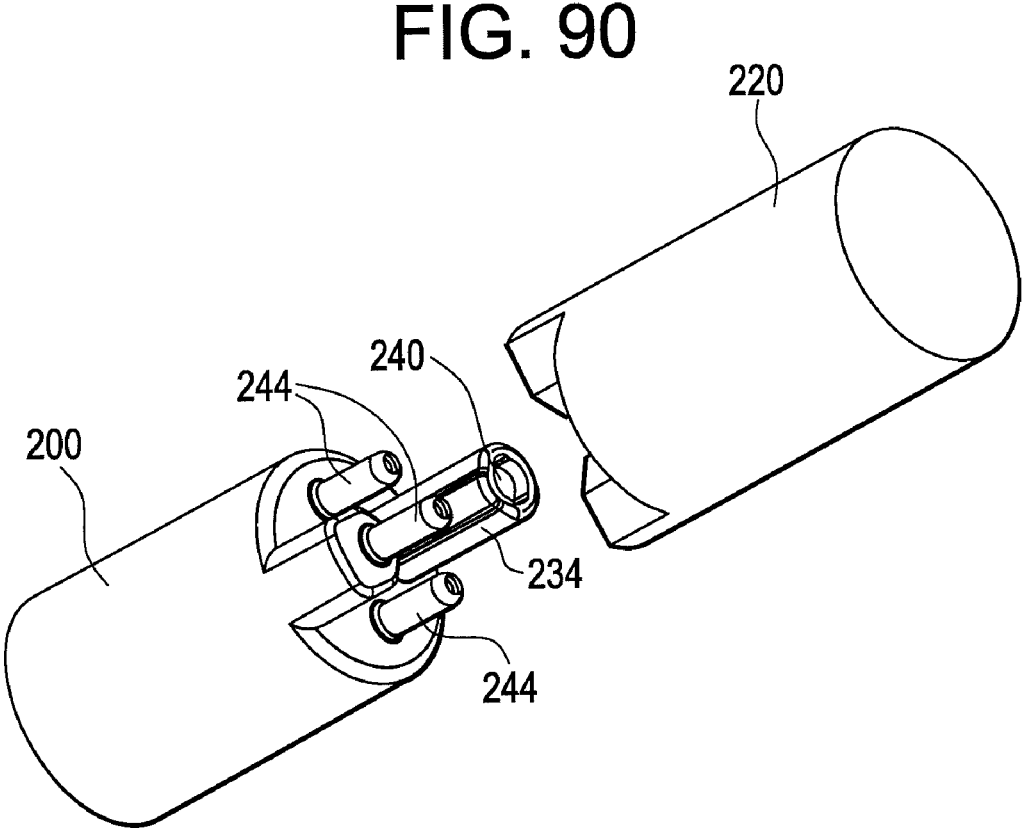

Similarly, with reference to FIGS. 25-29 and 30-37, receptacles or bases are shown which are configured to mate with the end caps of FIGS. 20-24 and 38-45, respectively. Thus, receptacle 30' of FIG. 25 includes male extension 132 which is sized and configured to be received by recess 122 in FIG. 20. Receptacle 30a of FIGS. 30-37 includes male extension 134a which is sized and configured to be received by recess 124a in FIG. 38. FIG. 38 also shows how semi-circular bases 72a may contain an asymmetrical section 72b which may be added to help ensure that unauthorized parts are unable to be used. This is a safety feature because improper wattage lamps or improper lamp designs may commonly be attempted to be substituted so the asymmetrical section 72b helps to prevent this unsafe occurrence. The sockets shown on FIGS. 30-37 may be used with the corresponding end caps or bases shown in FIGS. 38-45 or the designs may be exchanged with each other, i.e., the end cap may look like the receptacle or base or vice versa. Receptacle 94' of FIG. 26 includes arcuate shaped male extension 134 which is sized and configured to be received by arcuate recess 124 in FIG. 21. Similarly, receptacle 96' of FIG. 27 includes a rectangular extension 136 which is sized and configured to be received by rectangular recess 126 of FIG. 22, receptacle 98' of FIG. 28 includes a square shaped extension 138 which is sized and configured to be received by squared shaped recess 128 in FIG. 23 and receptacle 100' of FIG. 29 includes a triangular shaped extension 140 which is sized and configured to be received by rectangular shaped recess 130 in FIG. 24.

It will be appreciated that all of the embodiments of the present invention represent an advance over the stepped cap configuration of the aforementioned '527 patent in that the use of the extension (or alternatively the recess) positioned centrally along the barrier wall will provide improved interlocking between the lamp and the receptacle and will also ensure proper orientation of the respective pins within the recesses of the receptacle.

In operation, the cover 26 is removed, and a lamp 32 is inserted into the interior of the sleeve 14 via the aperture in the support wall 18. After insertion, the socket 30 is connected to the pins 48, 50, 52, 54. Then the cover 26 is installed on the housing 12. Electrical wires 66, 68 extend exteriorly of the socket to a non-illustrated electrical power supply. A voltage difference across the wires 66, 68 is applied to both electrodes 40, 42 causing an electrical discharge within the tube. This discharge causes ultraviolet radiation to be emitted. This radiation passes through the light-transmissive wall of the sleeve 14 to irradiate the water contained in the space 16.

The aforementioned barrier wall 70a, 70b prevents arcing interiorly of the end cap 44 by physically separating the electrical connections between the pins 48, 50 and the wire conductor, on the one hand, and the electrical connections between the pins 52, 54 and the electrode 40, on the other hand. The pairs of pins are thus effectively isolated.

It will be understood that each of the elements described above, or two or more together, also may find a useful application in other types of constructions differing from the types described above.

In at least another embodiment of the invention, a lamp base 200 may include at least one female pin connector 240 and a socket 220 may include at least one male pin connector 244, as seen in FIGS. 46-90.

For example, FIGS. 46-53 show various views of a socket 220 according to at least an embodiment of the present invention. The socket 220 may be generally cylindrical in shape, for example, a cylindrical body made of a non-conductive material. On one end 272 of the socket, a cavity 230 may be provided. In the particular embodiment shown in FIGS. 46-53, the cavity is formed in a cross shape, although it will be appreciated that many different shapes of cavity 230 are possible.

Additionally, at least one male pin connector 244 may be provided within the cavity 230. In the embodiment shown in FIGS. 46-53, four male pin connectors 244 are arranged at the four ends of cross-shaped cavity 230, although it will be appreciated that the male pin connectors 244 may be arranged in other patterns and in varying number. Male pin connectors 244 may be connected to an external power supply, for example, to supply electrical power to socket 220. It will also be appreciated that because male pin connectors 244 are arranged within cavity 230, male pin connectors 240 are protected from damage from inadvertent contact or miscoupling, thus preventing bending or breaking of the male pin connectors 240.

Additionally, FIGS. 46-53 show that socket 220 may also include at least one key protrusion 250. In the embodiment seen in FIGS. 46-53, two key protrusions 250 are located on the outer periphery of one end 272 of socket 220. However, it will be appreciated that many different configurations of key protrusions 250 are possible, including different numbers, shapes, sizes, and placement of key protrusions. The key protrusions 250 are designed to mate with a corresponding key recess 254 of the lamp base 200 (described in more detail below).

FIGS. 54-61 illustrate various views of a lamp base 200 according to at least an embodiment of the present invention. Lamp base 200 is generally cylindrical in shape, for example, a cylindrical body, and is designed to fit over one end of a lamp, for example arc tube 34. A sheath 234 may extend from one end 270 of the lamp base 200 in a direction along the long axis of the cylindrical lamp base 200. Sheath 234 is made of a non-conductive material, for example ceramic, and may be the same material as lamp base 200 or a different material. Additionally, sheath 234 may be integrally formed with lamp base 200, or may be attached to lamp base 200 through other means such as by adhesive. In the particular embodiment shown in FIGS. 54-61, the sheath 234 is formed in a cross shape, although it will be appreciated that many different shapes of the sheath 234 are possible.

Additionally, as seen in FIGS. 54-61, lamp base 200 may also include at least one female pin connector 240 provided within sheath 234, such that sheath 234 surrounds the sides of the female pin connectors 240 while leaving an end of the female pin connectors 240 open or exposed for coupling. In the particular embodiment shown in FIGS. 54-61, four female pin connectors 240 are provided at the ends of the cross-shaped sheath 234, but it will be appreciated that female pin connectors 240 may be arranged in other patterns and in varying number. It will also be appreciated that because female pin connectors 240 are provided within the sheath 234, female pin connectors 240 are protected from damage caused by inadvertent contact or miscoupling, for example.

The use of female pin connectors on the lamp base is important because it results in advantages in the manufacturing process. For example, it is easier to manufacture a lamp base using female pin connectors, instead of male pin connectors as done in conventional devices, because female pin connectors can be mounted using a crimping step. Accordingly, a soldering connection is not necessary for the female pin connectors, thus simplifying the manufacturing process.

Additionally, FIGS. 54-61 show that a lamp base 200 may include key recesses 254. In the embodiment seen in FIGS. 54-61, two key recesses 254 are located on the outer periphery of one end 270 of lamp base 200. However, it will be appreciated that many different configurations of key recesses 254 are possible, including different numbers, shapes, sizes, and placement of key protrusions. The key recesses 254 are designed to mate with corresponding key protrusions 250 of the lamp base 200, as described above.

According to at least an embodiment of the invention, lamp base 200 is designed to couple with socket 220 so that an electrical connection is established between lamp base 200 and socket 200. For example, the lamp base 200 shown in FIGS. 54-61 is designed to couple with the socket 220 shown in FIGS. 46-53. A number of the structures described above are important in providing a secure coupling between socket 220 and lamp base 200 as well as improving safety and performance.

For example, it will be appreciated that the sheath 234 is designed to fit within the cavity 230 of socket 220. This correspondence of the shapes of the sheath 234 and the cavity 230 helps to align the male pin connectors 244 of the socket 220 with the female pin connectors 240 of the lamp base.

Additionally, a variety of different shapes of sheaths 234 and cavities 230 may be used to ensure proper angular orientation of the pin connectors. For example, as seen in FIGS. 70-74, the sheath 234 surrounding the female pin connectors may be "T" shaped (234a, 234d), "U"-shaped (234b, 234e), "Z"-shaped (234c), or another appropriate shape.

For example, one useful class of sheaths (and corresponding cavities) is sheaths wherein a transverse cross section of the sheath (and the corresponding cavity) is rotationally asymmetric about a center of the end of the lamp base 200. In other words, if the lamp base 200 with a sheath that has a rotationally asymmetric cross section is rotated around an axis passing through its center, there is only one possible angular orientation in which the lamp base will couple with a corresponding socket. For example, when the sheaths 234a-234b and 234d-234e shown in FIGS. 70-71 and 73-74 are coupled with a corresponding cavity, it ensures that the pin connectors can be coupled in only one possible alignment. This feature is important to ensure proper operation of the lamp, i.e., the lamp may not work or may be damaged if the pin connectors of the lamp base are not connected to an appropriate power supply. Additionally, the mating of sheaths and cavities can be used as a safety feature, for example to ensure that a lamp rated for a particular power supply is not inadvertently coupled to a power supply that is too powerful, or to prevent misalignment of the connector, thus preventing a fire or electrical shock hazard.

Additionally, the mating of key protrusions 250 and key protrusions 254 can also help to ensure proper alignment of lamp base 200 and socket 220. For example, as seen in FIGS. 46-61, it will be appreciated that lamp base 200 and socket 220 cannot be coupled unless key protrusions 250 are aligned with key recesses 254. As described above, this helps to ensure proper angular alignment of the pin connectors, as well as serving as a safety feature to ensure that only appropriate lamp bulbs are coupled with appropriate sockets.

As seen in FIG. 69, it will be appreciated that a variety of configurations are possible for the key protrusions 250, and, consequently, the key recesses 254. For example, FIG. 69 shows that key protrusions can be placed anywhere along the periphery of the socket.

Thus, even if a lamp base and socket assembly has a sheath and cavity that are rotationally symmetrical, the lamp base and socket assembly itself can be made rotationally asymmetric through the use of key protrusion and key recesses. For example, as seen in FIGS. 66 and 67, a cross shaped sheath 234 and cavity 230 may be rotationally symmetrical. However, through the use of key protrusions 250 and key recesses 254, it is clear that lamp base 200 and socket 220 can only be coupled together in one possible orientation.

Thus, in at least one embodiment of the present invention, the lamp base and socket assembly will include either a sheath and cavity combination that is rotationally asymmetric (as in FIGS. 70-71 and 73-74), or a key protrusion and key recess combination that is rotationally asymmetric (as in FIGS. 66 and 67). Additionally, at least an embodiment may include both of these features, i.e., rotational asymmetry in both the sheath and cavity as well as the key protrusion and key recess.

As noted above, there are many alignment features designed to ensure that the lamp base 200 is properly aligned with socket 220 when they are coupled, for example, the key protrusions 250 and key recesses 254 and the sheaths and corresponding cavities. These alignment features result in significant and non-trivial benefits over conventional devices.

For example, it will be appreciated that the alignment features described above can ensure that there is only one possible way for a lamp base to fit into the socket. In other words, the alignment features ensure that a female pin connector on the socket always couples with the appropriate male pin connector on the socket. This is an important safety feature because it prevents the pin connectors from mistakenly being connected to the wrong polarity of a power source, for example, which could damage the lamp. Thus, the alignment features described above can help to prevent damage to lamps by ensuring proper coupling.

Additionally, the alignment features described above can help to ensure that a lamp is only coupled with an appropriate socket. For example, an appropriate socket may have a given configuration of key protrusions and cavity and unless the lamp base is a properly corresponding lamp base that has complementary key recesses and sheath, the lamp base cannot be coupled to the socket. This helps to ensure that the proper model of lamp is used with a particular socket.

Additionally, these features provide important safety benefits as well. For example, if connector pins are improperly connected to the wrong polarities, sparks can be generated that pose a fire risk, or the user may be exposed to electric shock. Each of the alignment features above helps to ensure proper coupling of lamp bases and sockets, thus reducing the risk of these hazards and protecting the safety of the user.

FIGS. 65 and 68 show how a stable coupling is achieved in at least an embodiment of the present invention. For example, as seen in FIG. 65, male pin connectors 244 may include a male neck 246. Male neck 246 is a portion of male pin connector that has a slightly smaller radius than the portions of the male pin connector 246 immediately adjacent to the male neck 246. As seen in FIG. 68, the female pin connectors 240 on the corresponding lamp base 200 may include a female neck 242. Female neck 242 is a portion of a female pin connector that has a slightly smaller inner radius than the portions of the female pin connector immediately adjacent to the female neck 242. When male pin connector 244 is inserted into female pin connector 240, the male neck 246 aligns with the female neck 242, thus snapping the connectors into place and ensuring a stable connection.

It will also be appreciated that the lamp base is not limited to four female pin connectors and that the socket is not limited to four male pin connectors. For example, FIGS. 76-82 illustrate at least one possible embodiment wherein lamp base 200 is provided with three male pin connectors 244 and one female pin connector 240, and socket 220 is provided with three female pin connectors 240 and one male pin connector 244. Similarly, it is possible for a lamp base to have two female pin connectors and two male pin connectors, or three female pin connectors and one male pin connector. Likewise, it is possible for a socket to have two female pin connectors and two male pin connectors, or three male pin connectors and one female pin connector.

Also, as seen in FIGS. 75-78 it is not necessary for all the pin connectors on the lamp base to be enclosed within a sheath 234. For example, in the embodiments seen in FIGS. 75-78, only one female pin connector 240 is surrounded by sheath 234. Similarly, as seen in FIGS. 79-84, only one male pin connector 244 may be provided within a cavity 230 on socket 220.

FIGS. 75-78 also show another possible feature for ensuring proper alignment of a lamp base and socket. For example, in FIGS. 75-78, lamp base 200 is provided with a step portion 280, and a male pin connector 244 is provided on step portion 280. Thus, the male pin connector 244 provided on step portion 280 is provided at a different level than the other male pin connectors 244. This feature helps to ensure that lamp base 200 can only be coupled with socket 220 in a particular orientation.

Figure 91:
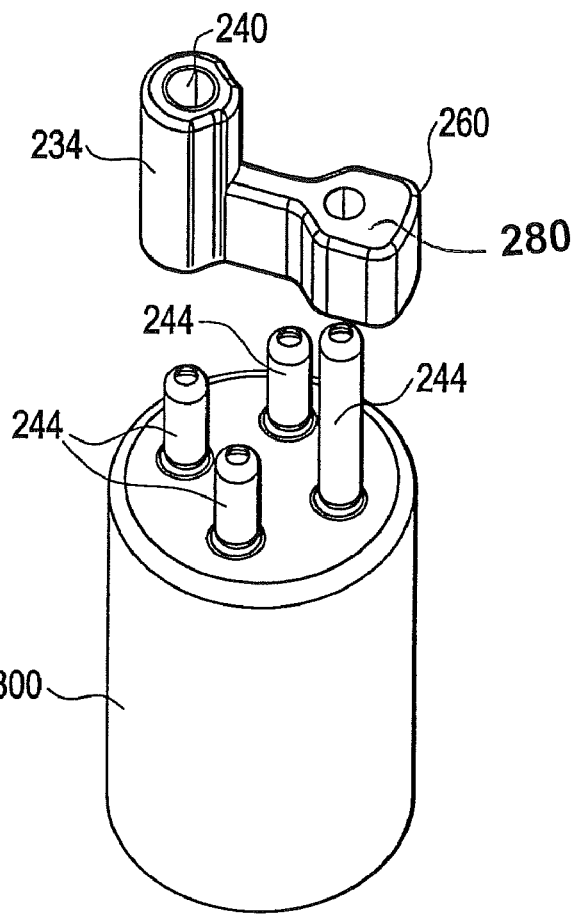
FIG. 91 is an exploded perspective view of a lamp base and an adapter according to at least an embodiment of the present invention.
Figure 92:
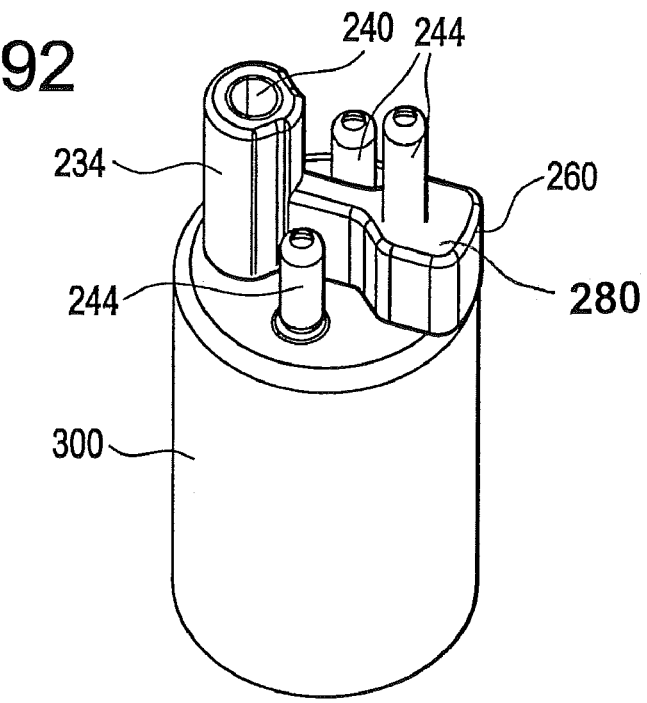
FIG. 92 is an assembled perspective view of a lamp base and an adapter according to at least an embodiment of the present invention.

In at least another embodiment of the present invention, seen in FIGS. 91-92, a lamp base 300 can be fitted with an adaptor 260 to take advantage of the operational and safety features described above. For example, FIG. 91 shows a lamp base 300 with four male pin connectors 244. Because there are no keys, sheaths, cavities, step portions or similar structures on lamp base 300, it will be appreciated that lamp base 300 may improperly couple with a socket. For example, the male pin connectors 244 may be rotated from their proper positions.

To overcome this, lamp base 300 can be fitted with adaptor 260. In the particular embodiment shown in FIGS. 91-92, adaptor 260 converts a lamp base 300 with for male pin connectors 244 into a lamp base with two male pin connectors 244, a male pin connector 244 on a step portion 280, and a female pin connector 240 within a sheath 234. Thus, existing lamp bases can be upgraded through the use of an adaptor to ensure that the lamp base only couples in a particular way with appropriate sockets. This allows a user to achieve the operation and safety advantages described above without have to discard previously purchased lamps.

While the invention has been illustrated and described as embodied in an ultraviolet lamp for use in water or other liquid or air purifiers, it is not intended to be limited to the details shown, since various modifications and structural changes may be made without departing in any way from the spirit of the present invention. Thus, the lamp of this invention need not be limited to lamps that emit ultraviolet radiation, nor be limited to use in a water purifier.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lamp base to be fitted on an end of a lamp bulb and designed to couple with a socket, the lamp base comprising:
   a cylindrical body having an end face at a first end thereof;
   a sheath made from a non-conductive material and extending from the end face of the cylindrical body in a direction parallel to an axis of the cylindrical body;
   a first pin connector provided within the sheath, the first pin connector being a female pin connector;
   a step portion provided on the end face;
   a second pin connector provided on the step portion, such that the second pin connector is displaced from the end face in a direction of the axis of the cylindrical body, the second pin connector being a male pin connector; and
   a third pin connector and a fourth pin connector extending from the end face, the third and fourth pin connectors being male pin connectors.

2. A socket designed to couple with a lamp base comprising a first female pin connector provided within a sheath, a second male pin connector provided on a step portion of the lamp base, and a third male pin connector and a fourth male pin connector provided on an end face of the lamp base, the socket comprising:
   a cylindrical body having an end face;
   a cavity provided in the end face of the cylindrical body;
   a first socket pin connector provided within the cavity, the first socket pin connector being a male pin connector;
   a recessed portion recessed from the end face;
   a second socket pin connector provided on the recessed portion, the second socket pin connector being a female pin connector recessed into a face of the recessed portio, and
   a third socket pin connector and a fourth socket pin connector, the third socket pin connector and fourth socket pin connector being female pin connectors recessed into the end face.

3. An lamp base and socket assembly for use with a lamp bulb, the assembly comprising:
   a lamp base structured to fit on an end of the lamp bulb, the lamp bulb comprising:
      a cylindrical lamp base body having a lamp base end face at a first end thereof;
      a sheath made from a non-conductive material and extending from the lamp base end face in a direction parallel to an axis of the cylindrical lamp base body;
      a first base pin connector provided within the sheath, the first base pin connector being a female pin connector;
      a step portion provided on the lamp base end face;
      a second base pin connector provided on the step portion, such that the second pin connector is displaced from the lamp base end face in a direction of the axis of the cylindrical lamp base body, the second base pin connector being a male pin connector; and
      a third base pin connector and a fourth base pin connector extending from the lamp base end face, the third and fourth base pin connectors being male pin connectors; and
   a socket structured to couple with the lamp base, the socket comprising:
      a cylindrical socket body having a socket end face;
      a cavity provided in the second end face;
      a first socket pin connector provided within the cavity, the first socket pin connector being a male pin connector;
      a second socket pin connector provided on the recessed portion, the second socket pin connector being a female pin connector recessed into a face of the recessed portion; and
      a third socket pin connector and a fourth socket pin connector, the third socket pin connector and fourth socket pin connector being female pin connectors recessed into the socket end face
   wherein the first female pin connector of the lamp base is structured to receive the first male pin connector of the socket therein, thus electrically connecting the lamp base and the socket;
   the cavity of the socket is structured to receive the sheath of the lamp base therein;
   the recessed portion of the socket is configured to couple with the step portion of the lamp base;
   the second, third, and fourth socket pin connectors are configured to respectively couple with the second, third, and fourth base pin connectors.

4. An adaptor for use with a lamp base comprising a first male pin connector, the adaptor comprising:
   a sheath;
   a female pin connector provided within the sheath; and
   a step portion connected to the sheath structured to fit over a second pin connector provided on the lamp base such that the second pin connector of the lamp base extends through the step portion;
   wherein the sheath is structured to fit over the first male pin connector such that the female pin connector is electrically connected to the first male pin connector.

* * * * *